US012192236B2

(12) United States Patent
Srinivasan et al.

(10) Patent No.: US 12,192,236 B2
(45) Date of Patent: Jan. 7, 2025

(54) TRANSPORT LAYER SECURITY OFFLOAD TO A NETWORK INTERFACE

(71) Applicant: Intel Corporation, Santa Clara, CA (US)

(72) Inventors: Arvind Srinivasan, San Jose, CA (US); Daniel Daly, Santa Barbara, CA (US)

(73) Assignee: Intel Corporation, Santa Clara, CA (US)

( * ) Notice: Subject to any disclaimer, the term of this patent is extended or adjusted under 35 U.S.C. 154(b) by 145 days.

(21) Appl. No.: 16/838,888

(22) Filed: Apr. 2, 2020

(65) Prior Publication Data

US 2020/0236140 A1 Jul. 23, 2020

Related U.S. Application Data

(60) Provisional application No. 62/834,936, filed on Apr. 16, 2019.

(51) Int. Cl.
*H04L 9/40* (2022.01)
*H04L 5/00* (2006.01)
*H04L 69/166* (2022.01)

(52) U.S. Cl.
CPC .......... *H04L 63/166* (2013.01); *H04L 5/0055* (2013.01); *H04L 63/0485* (2013.01); *H04L 69/166* (2013.01)

(58) Field of Classification Search
CPC .................. H04L 63/166; H04L 5/0055; H04L 63/0485; H04L 69/166; H04L 63/168
See application file for complete search history.

(56) References Cited

U.S. PATENT DOCUMENTS

| 7,409,558 B2 | 8/2008 | Beukema et al. |
| 10,211,985 B1 | 2/2019 | Brandwine et al. |
| 10,778,585 B1 * | 9/2020 | Saalfeld ................ H04L 67/148 |
| 11,062,302 B1 * | 7/2021 | Ho ........................ G06Q 20/227 |

(Continued)

OTHER PUBLICATIONS

"Kernel Transport Layer Security (kTLS) Offloads", NVIDIA, https://docs.nvidia.com/networking/m/view-rendered-page.action?abstractPageId=37849165, downloaded from the internet Nov. 2, 2022, 2 pages.

(Continued)

*Primary Examiner* — Nam T Tran
(74) *Attorney, Agent, or Firm* — Compass IP Law PC

(57) ABSTRACT

Examples described herein relate to an interface that is to receive data for transmission and based on indication of failure of receipt of one or more packets that carry segments of the data, cause re-transmission of solely one or more of the multiple packets that comprise a segment of the data referenced by the indication of failure of receipt of one or more packets. In some examples, the interface is to encrypt the data using an encryption engine and to segment the data for transmission using one or more packets. In some examples, the interface is to receive the data and an indication of which segment of the data to re-transmit; encrypt the data; segment the encrypted data into one or more packets; and based on the indication of which segment of the data to re-transmit, transmit solely one or more of the multiple packets that comprise a segment of the data referenced by the indication of failure of receipt of one or more packets.

22 Claims, 14 Drawing Sheets

(56) References Cited

U.S. PATENT DOCUMENTS

| | | | |
|---|---|---|---|
| 2007/0130352 A1* | 6/2007 | Chhabra | H04L 69/22 709/230 |
| 2007/0162744 A1 | 7/2007 | Hoshino et al. | |
| 2007/0291782 A1* | 12/2007 | Basso | H04L 69/166 370/428 |
| 2009/0249059 A1 | 10/2009 | Asano | |
| 2010/0165897 A1 | 7/2010 | Sood | |
| 2010/0223457 A1 | 9/2010 | Durham et al. | |
| 2016/0234123 A1 | 8/2016 | Alisawi et al. | |
| 2016/0330112 A1* | 11/2016 | Raindel | H04L 63/0428 |
| 2018/0152467 A1* | 5/2018 | Anderson | H04L 47/2441 |
| 2018/0167207 A1 | 6/2018 | Chaubey et al. | |
| 2019/0116127 A1* | 4/2019 | Pismenny | H04L 63/166 |
| 2019/0124054 A1* | 4/2019 | Zhang | H04L 63/166 |
| 2019/0132296 A1* | 5/2019 | Jiang | H04L 69/22 |
| 2019/0229903 A1* | 7/2019 | Balasubramanian | H04L 63/166 |
| 2020/0236140 A1 | 7/2020 | Srinivasan et al. | |
| 2021/0160009 A1* | 5/2021 | Goyal | H04L 1/0054 |
| 2021/0211467 A1 | 7/2021 | Naeimi et al. | |
| 2021/0281608 A1* | 9/2021 | Green | H04L 9/3263 |
| 2022/0329558 A1 | 10/2022 | Khan | |

OTHER PUBLICATIONS

Baldwin, John, "TLS Offload in the Kernel", FreeBSD Journal, May/Jun. 2020, 12 pages.

Mellanox, Chelsio and Netflix, "Kernel TLS and hardware TLS offload in FreeBSD 13", Mellanox Technologies, Sep. 29, 2019, 30 pages.

Nowlan, Michael F., "Unordered Delivery in TLS-Encrypted TCP Connections", Department of Computer Science, Yale University, Downloaded from the internet Nov. 2, 2022, 7 pages.

Chelsio Communications, "Crypto Offload", https://web.archive.org/web/20180418210314/https://www.chelsio.com/crypto-offload/, Apr. 18, 2018, 2 pages.

Netdev, "TLS Offload to Network Devices", Netdev 1.2, https://web.archive.org/web/20171202211713/https://netdevconf.org/1.2/session.html?boris-pismenny, Dec. 2, 2017, 4 pages.

Netdev, "TLS Receive Side Crypto Offload", Netdev 2.2—Session, https://web.archive.org/web/20180131144710/https://www.netdevconf.org/2.2/session.html?pismenny-tlscrypto-talk, Jan. 31, 2018, 3 pages.

Netronome, "Agilio® CX 50GbE SmartNIC for OCP With Inline Crypto and Buffer Management", Product Brief, Netronome Systems, Inc., Mar. 2019, 2 pages.

Pismenny, Boris, "TLS Crypto Offload to Network Devices", Mellanox Technologies, Netdev conference, Tokyo, Oct. 2016, 22 pages.

Pismenny, Boris, et al., "TLS Offload to Network Devices—Rx Offload", Mellanox, Dec. 3, 2017, 5 pages.

Stewart, Randall, et al., "Optimizing TLS for High-Bandwidth Applications in FreeBSD", Netflix Inc., Feb. 13, 2015, 6 pages.

Watson, Dave, "Crypto kernel TLS socket", https://lwn.net/Articles/665602/, Nov. 23, 2015, 2 pages.

Watson, Dave, "KTLS: Linux Kernel Transport Layer Security", Facebook, San Francisco, USA, Sep. 26, 2016, 4 pages.

International Search Report and Written Opinion for PCT Patent Application No. PCT/US21/52078, Mailed Jan. 19, 2022, 11 pages.

Nowlan, Michael, "Unordered Delivery in TLS-Encrypted TCP Connections", 690 Report, Department of Computer Science, Yale University, Published 2011, 7 pages.

First Office Action for U.S. Appl. No. 17/189,219, Mailed Dec. 21, 2023, 14 pages.

* cited by examiner

TRANSPORT LAYER SECURITY OFFLOAD TO A NETWORK INTERFACE

RELATED APPLICATION

The present application claims the benefit of a priority date of U.S. provisional patent application Ser. No. 62/834,936, filed Apr. 16, 2019, the entire disclosure of which is incorporated herein by reference.

DESCRIPTION

Various cryptographic protocols provide security of communications made over a computer network. Secure Sockets Layer (SSL) and Transport Layer Security (TLS) are examples of security protocols. TLS provides end-to-end encryption at the application layer and TLS can secure application-to-application communication. For example, cloud service providers (e.g., social media and online payment platforms) use TLS to provide secure communications. TLS is a widely deployed protocol used for securing TCP connections on the Internet. TLS is also a feature for HTTP/2, an Internet protocol.

DETAILED DESCRIPTION

Figure 1:
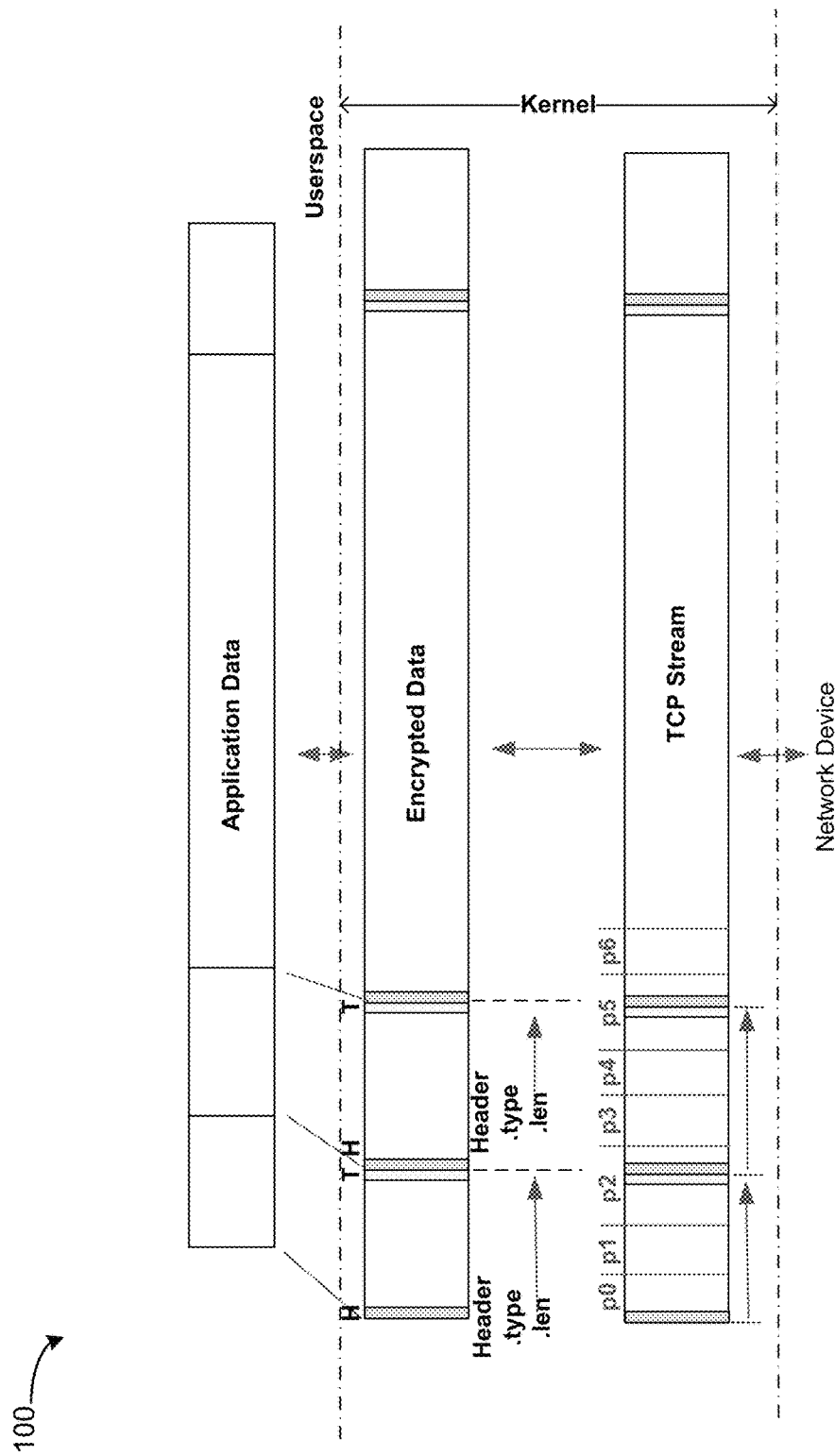
FIG. 1 shows a flow of information from application data to the network.

TLS is defined at least in The Transport Layer Security (TLS) Protocol Version 1.3, RFC 8446 (August 2018), which is incorporated by reference in its entirety. TLS encrypts data of an arbitrary size as it passes from one end of a socket to another end. TLS can involve encrypting up to, e.g., 16 KB of data at a time using a cryptographic key agreed upon by two sides of the connection. Periodically, the two sides of the connection can agree to update the key, such as for long-lived connections (e.g., an audio or video stream). Kernel TLS (kTLS) is a Linux kernel implementation of a TLS data path whereby encryption and decryption operations are moved into the kernel and inline with the flow of traffic into and out of a computer or server.

In some examples, some or part of encryption and decryption operations of a security protocol are offloaded from an operating system kernel to the network interface (e.g., network interface controller). Moving encryption and decryption into the network interface can free up cores and memory bandwidth for other uses by applications and customer workloads. CPU-based cryptography offloads involve copying data out of memory, into an encryption/decryption engine, and copying encrypted/decrypted data back into memory. In some cases, many copy operations can take place where encryption or decryption operations are performed on individual relatively small-sized records (e.g., 16 KB) and records are encrypted or decrypted one record at a time. In other words, while an offload engine can save CPU cycles as compared to performing the same operation using CPU instructions, CPU resources (e.g., CPU cycles, cache space, and memory space) are utilized to migrate data for use by the encryption/decryption engine and after use by the encryption/decryption engine.

In some solutions, a network interface is used to perform encryption/decryption in the upper layers of the Open Systems Interconnection model (OSI) stack (e.g., layers 5-6), above Transport Layer 4. For data re-transmission in the event of packet loss or drops, packets are to be re-transmitted. However, benefits of hardware offload can dissipate or even disappear as the re-transmit rate of the link exceeds 1-2% of transmitted packets. At the receive side, where a network interface uses a decryption engine to decrypt packet content, some solutions fall back to the CPU-based decryption immediately in response to any packet loss, thereby losing benefits from use of a decryption engine.

Various embodiments provide cryptographic (e.g., encrypt or decrypt) offload to a network interface (or other circuitry (e.g., local accelerator or remote accelerator)) while maintaining operation of the associated transport protocol and continuing to use offload capabilities in the event of packet drops or re-transmits. A transmitter system can cause data (e.g., a record) to be encrypted using a cryptographic offload engine and encrypted data segments transmitted using one or more packets. For example, data can be segmented, encrypted, and encrypted segments transmitted using one or more packets. The transmitter system can track what part of the data is allocated to which transmitted packet in accordance with its transport protocol state. The transmitter system can provide a vector or indicator to identify which segment of data is to be transmitted. For example, for data that is divided into multiple segments, the transmitter system indicates which segment is to be transmitted in one or more packets.

In response to a request for a packet retransmission (e.g., negative-acknowledgement (NACK) or duplicate acknowledgement (ACK)), the transmitter system can provide data for encryption and identify a segment associated with the packet that is to be re-transmitted. In order to re-transmit a packet, the data in the re-transmitted packet is to be encrypted but in some cases, fewer than all of the multiple packets are to be re-transmitted. The transmitter system can identify which packet to re-transmit instead of re-transmitting all packets sent that carried the encrypted data. Accordingly, network bandwidth can be saved in the event of packet re-transmission.

According to various embodiments, a receiver system can store received packets in a memory accessible to a network interface. From received packets, data segments can be buffered in a memory until all segments of the data are received. The buffer can also be used to provide quality of service (QoS) and congestion control for traffic. To determine if all data segments are received, the network interface can store a context to account for receipt of a data segment by identifying a beginning of a data and its length from a packet header that indicates a beginning of a data and a length of the data. The context can be stored in a memory accessible to the network interface. The memory (e.g., DRAM) can be on or off-chip from the network interface and accessible by the network interface (or other device).

After all segments of the data are received, the data can be decrypted using a decryption engine used by the network interface and decrypted data copied to host memory (e.g., using a direct memory access (DMA) engine) and available for access in user space by an application or other device.

For example, kTLS hardware offload can process a TLS record level directly and provide decrypted records to memory accessible to an application stack. From a protocol standpoint, entire records are decrypted at a network interface and unencrypted clear text is copied to memory for access by an application. For TLS, a record can be carried over multiple TCP packets (or other transport layer packets) that can arrive at the receiver in an out-of-order manner.

According to various embodiments, the receiver network interface system can manage receipt of data segments and determine whether to send acknowledgement of packet receipt or request re-transmission of any missing packet. In some examples, an operating system kernel can manage receipt of data segments via packets and determine whether to send acknowledgement of packet receipt or request re-transmission of any missing packet.

Various embodiments can provide line rate inline TLS encryption and manage packet re-transmits. Various embodiments can provide a receive path with line rate inline TLS decryption utilizing buffers and process transport layer protocol headers to ensure reliable delivery and congestion control. A receive path buffer can provide elasticity in the event of congestion, so that data can be stored while congestion notifications can reach the senders to adjust their transmission rates.

While examples are described with respect to TLS, any cryptography technique can be used such as any transport layer security or any cryptography scheme such as SSL, blockchain, Mozilla Network Security Services (NSS), DNS-based Authentication of Named Entities (DANE) (RFC 6698), and so forth.

FIG. 1 shows a flow of information from the application data to the network. In this example 100, an application in user space can originate application data for transmission or process received data. Application data can be unencrypted or encrypted data. A TLS layer can segment application data into records. Records can be encrypted. A record header can include fields of a header.type and header.len (record length) as well as application data. A record can end with a trailer, where a trailer can include TLS authentication fields. Based on applicable maximum segment size (MSS), an encrypted record can be provided for transmission using one or more packets as part of a stream of transmission control protocol (TCP) compatible packets. In this example, a record is transmitted over packets p0, p1, and p2 and another record is transmitted over packets p2, p3, p4, and p5. Note that packet p2 includes portions of two records.

Figure 2:
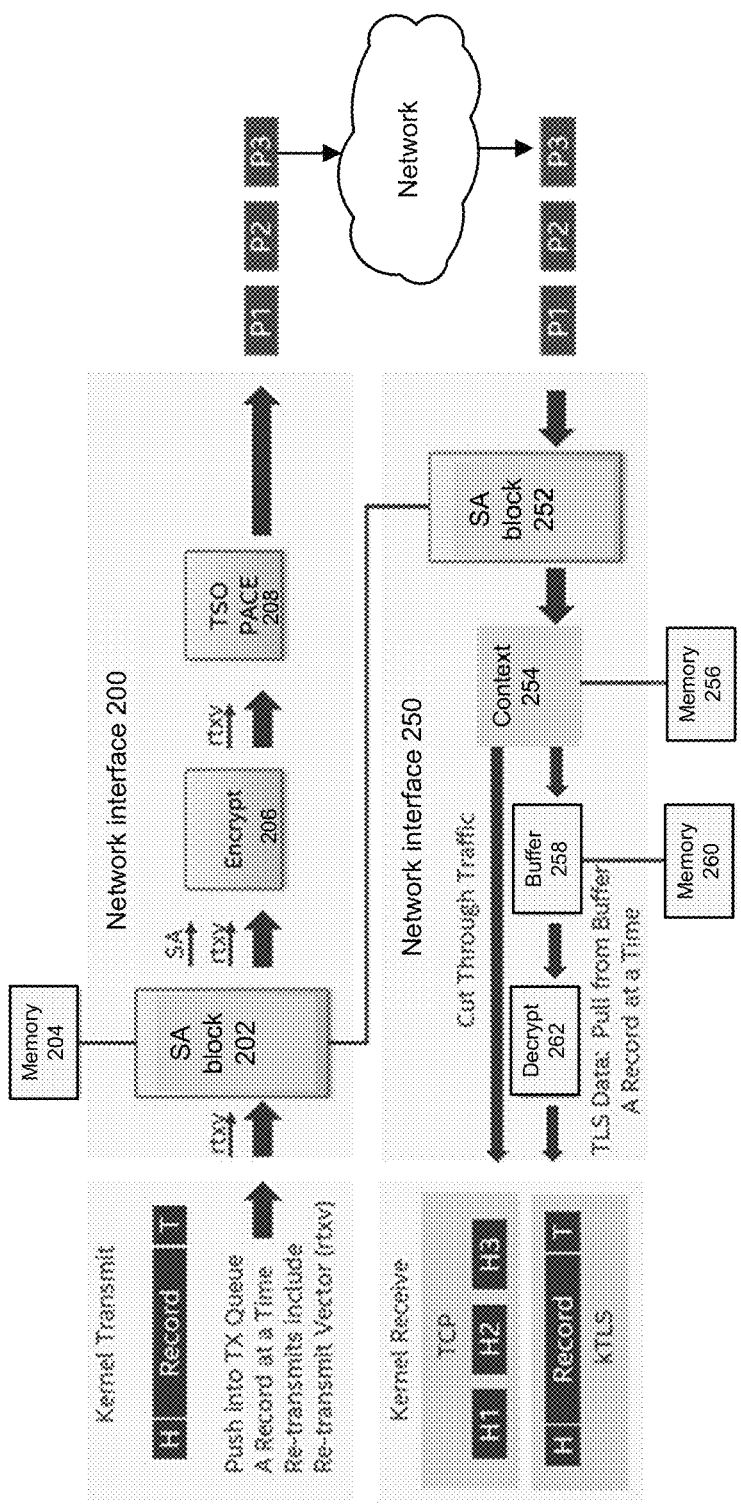
FIG. 2 shows a block diagram of end-to-end processing of data at a transmitter network interface and receiver interface.

FIG. 2 shows a block diagram of end-to-end processing of data at a transmitter network interface and receiver interface. A network interface can refer to one or more of: a network interface controller, network interface card, smart network interface, fabric interface, interface to an interconnect or bus, and so forth. Security association (SA) block 202 can perform a look up of an encryption key for characteristics of packet data to transmit. For example, for a socket or 5-tuple value of a packet (e.g., source IP address, destination IP address, protocol source port, protocol destination port, and protocol used), a key (e.g., SA) from memory 204 can be provided to encrypt block 206. A key negotiation with a receiver can be performed to determine a key for use to encrypt records so that all records in a socket use the same key for encryption. Encryption block 206 performs an encryption on a received record using the key from SA block 202.

Based on vector rtxv, transmit segmentation offload (TSO) transmit scheduler (PACE) engine 208 can determine which packet to transmit after encryption. As is described in more detail later, vector rtxv can be used to specify which packet(s) to re-transmit instead of re-transmitting all packets that convey a record. TSO PACE engine 208 can use a transmit scheduler to pace transmission of packets in the same n-tuple or flow identifier (e.g., 5-tuple), where n is an integer, or socket. A transmit scheduler may buffer data on-die, or use associated memory 204 to hold data as it is scheduled for transmission. TSO PACE 208 can provide for pacing traffic to a certain rate or rate limiting so a certain strain of packets can be interleaved with the TLS packets or provide a dead time. After TSO and transmit scheduling, the packet is sent out the uplink to be carried to the destination receiver.

In some examples, network interface 200 does not maintain packet-to-record state but such state is stored by a host system.

At network interface 250, for a received packet, SA block 252 provides a key to use to decrypt a record in a received packet. SA block 252 can provide a path for non-TLS traffic to a kernel for processing. For receive network interface 250, based on a 5-tuple lookup or context, a receive context can be formed and updated in memory 256 for received packets. Context processor 254 can indicate if a packet uses TLS processing offload and if TLS processing offload is used, a copy of the packet is buffered in memory 260. Further packet processing is used to determine where in host memory the packet is to be written.

Context processor 254 can maintain a context of received packets and store packets in buffer 258 until all packet(s) that transmit a particular record are received. After portions of or an entire record is received, the portions or record can be provided for decryption using decrypt block 262. A packet header includes a record length and the record can span one or multiple packets. For example, if packets p1-p3 transmit a single record, then if packet p1 is received before p2 and p3, packet p1 is stored in a buffer 258 until p2 and p3 are received. In some cases, data in p2 can be decrypted using a residual from decrypting data from p1 and data from p1 and p2 can be decrypted and provided to the host. Other examples are described herein. If p2 or p3 are not received, then a re-transmit request can be provided to the sender.

Periodically or at some events, the sender and receiver can negotiate use of a new key (re-key). In this case, the 5-tuple to SA mapping is updated at transmitter and receiver. In the event of re-keying, host software can be used to decrypt received data using the old key and new key while refreshing the 5-tuple to SA mapping.

Figure 3A:
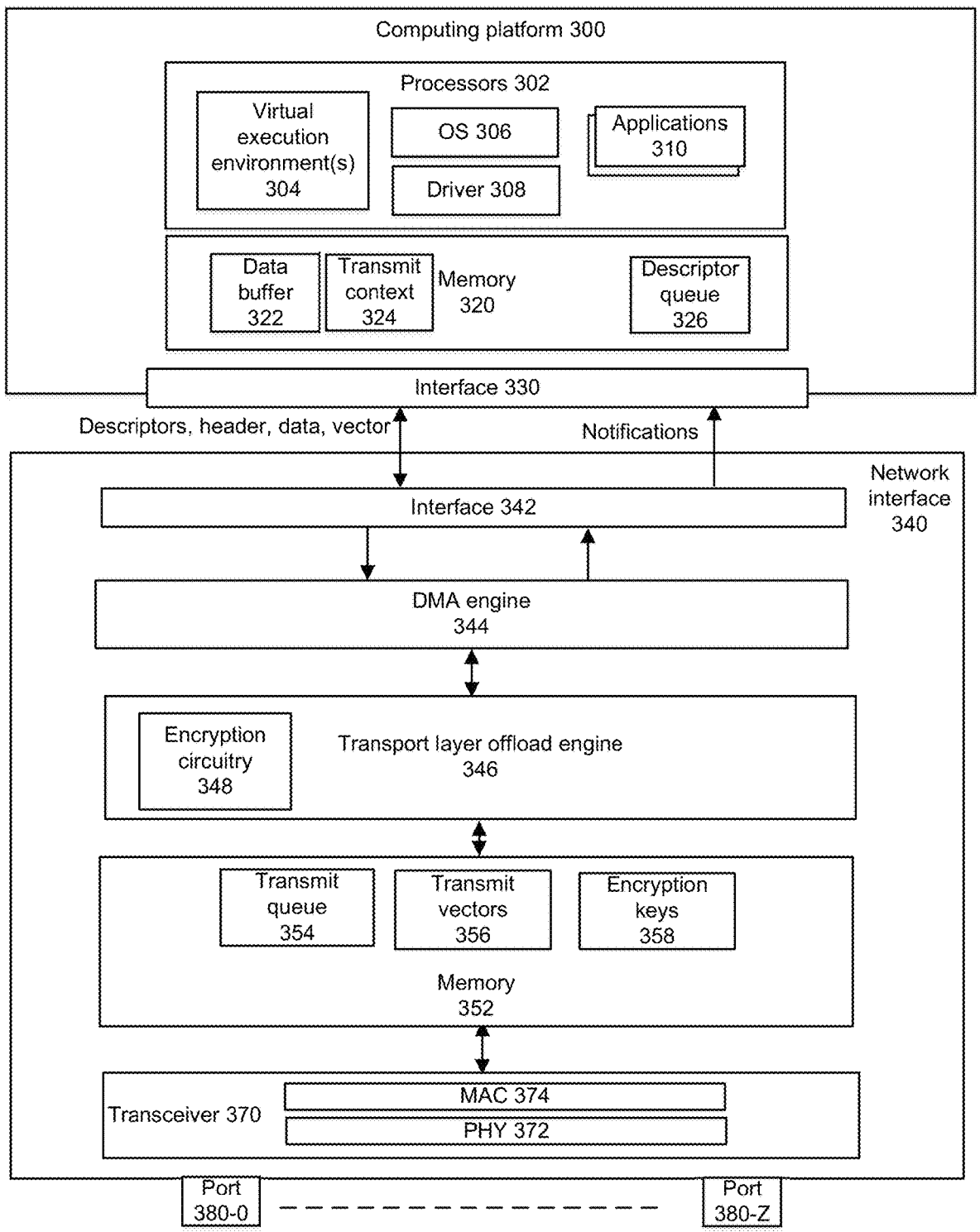
FIGS. 3A and 3B depict example systems.

FIG. 3A depicts an example system. In this system, computing platform 300 can provide data for transmission and offload encryption of data to network interface 340 and also control which specific packets, that contain segments of data, are transmitted (or re-transmitted) by network interface 340. For example, data can be encrypted using TLS or other encryption scheme. Network interface 340 can perform encryption on data or a record from platform 300 and segment encrypted data for transmission using one or more packets. In the event of packet loss or non-receipt at a receiver, network interface 340 can issue a NACK (or duplicate ACK) and cause re-transmission of the non-received packet. Application 310 can track record boundary per packet (e.g., packets 0-3 transmit record0; packets 3-4 transmit record1; and so forth) using transmit context 324 and determine which packet(s) to re-transmit. For example, if a NACK is received for packet 1, record0 is provided to network interface 340 to encrypt using encryption engine 348 but application 310 identifies merely packet 1 as to be re-transmitted using a transmit vector (rtxv) to indicate to transceiver 370 which packet to transmit. Accordingly, merely packets requested for re-transmission can be re-transmitted to transport the missing data segment instead of all packets that convey the data for which a data segment was not received by a receiver, while allowing offload of encryption and data segmentation to network interface 340.

Computing platform 300 can include at least various processors 302 and memory 320. Processors 302 can execute virtual execution environment 304, operating system 306, network interface driver (or device driver) 308, and applications 310. Processors 302 can be an execution core or computational engine that is capable of executing instructions. A core can have access to its own cache and read only memory (ROM), or multiple cores can share a cache or ROM. Cores can be homogeneous and/or heterogeneous devices. Any type of inter-processor communication techniques can be used, such as but not limited to messaging, inter-processor interrupts (IPI), inter-processor communications, and so forth. Cores can be connected in any type of manner, such as but not limited to, bus, ring, or mesh. Processors 302 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein.

A virtualized execution environment can include at least a virtual machine or a container. A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can be an OS or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from each other, allowing virtual machines to run Linux® and Windows® Server operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers are not installed like traditional software programs, which allows them to be isolated from the other software and the operating system itself. Isolation can include permitted access of a region of addressable memory or storage by a particular container but not another container. The isolated nature of containers provides several benefits. First, the software in a container may run the same in different environments. For example, a container that includes PHP and MySQL can run identically on both a Linux computer and a Windows® machine. Second, containers provide added security since the software may not affect the host operating system. While an installed application may alter system settings and modify resources, such as the Windows® registry, a container can only modify settings within the container.

In some examples, operating system 306 can be any of Linux®, Windows® Server, FreeBSD, Android®, MacOS®, iOS®, Cisco IOS, Juniper Junos, or any other operating system. Operating system 306 and applications 310 can run within a virtual execution environment 304 or outside of virtual execution environment 304. Driver 308 can provide an interface between virtual execution environment 304 or operating system (OS) 306 and network interface 340. In some examples, OS 306 queries device driver 308 for capabilities of network interface 150 and learns of a capability by network interface 340 to encrypt data for transmission and an application can control which packet to transmit or re-transmit. In other examples, OS 306 can instruct network interface 340 to encrypt data for transmission and an application can control which packet to transmit or re-transmit.

Applications 310 can be any type of application including media streaming application (e.g., video or audio), virtual reality application (including headset and sound emitters), augmented reality application, video or audio conference application, video game application, or database. In some examples, applications 310 run within a virtual execution environment 304 or outside of virtual execution environment 304.

Computing platform 300 can open a socket to send packet traffic to a receiver. For example, computing platform 300 (using network interface 340) and the receiver can perform a TLS handshake to exchange information and establish a connection. If the connection is established, computing platform 300 (or other entity) sends cipher information (e.g., encryption key) for this socket (e.g., security association (SA)) to network interface 340 for use by encryption circuitry 348. Platform 300 can write cipher information into encryption keys 358 to map a socket's 5-tuple (e.g., layer 3 destination, source, layer 4 destination port, layer 4 source port, protocol) to the cipher information given by the sender.

OS 306 can negotiate with network interface 340 via driver 308 to detect that offload TCP segmentation, data encryption, and control over particular packet transmission (or re-transmission) is available for data (e.g., TLS record-level). For example, application 310 can cause copying of application data from data buffer 322 to transmit queue 354 of network interface 340 to be encrypted using TLS (e.g., up to 16 KB of data, header and trailer). In some examples, OS 306 pre-segments data along TLS record boundaries instead of transport layer maximum segment size (MSS). For data to be transmitted, OS 306 can provide a vector that indicates whether to transmit any packet that is to carry a segment of data and the vector can be stored in transmit vectors 356 in memory 352.

Interface 330 and interface 342 can provide communicative coupling between platform 300 and network interface 340. For example, communicative coupling can be based on Peripheral Component Interconnect express (PCIe), or any public or proprietary standard. Direct memory access (DMA) engine 344 can transfer data and corresponding packet descriptor to memory 352. For example, a portion of the packet can be copied via DMA to a packet buffer in memory 352.

Direct memory access (DMA) is a technology that allows an input/output (I/O) device to bypass a central processing unit (CPU) or core, and to send or receive data directly to or from a system memory. Because DMA allows the CPU or core to not manage a copy operation when sending or receiving data to or from the system memory, the CPU or core can be available to perform other operations. Without DMA, when the CPU or core is using programmed input/output, the CPU or core is typically occupied for the entire duration of a read or write operation and is unavailable to perform other work. With DMA, the CPU or core can, for example, initiate a data transfer, and then perform other operations while the data transfer is in progress. The CPU or core can receive an interrupt from a DMA controller when the data transfer is finished.

Transport layer offload engine 344 inspects packet data in transmit queue 354 and determines if a packet's header (e.g., 5-tuple) identifies the packet as a TLS record and a security association (SA) is found for this 5-tuple. For example, a transmit queue 354 can include packet related information for packet transmission including one or more of: L2 header, L3 header, TCP header, TLS Record Header, TLS Application Data, and TLS Record Trailer. Transport layer offload engine 346 can cause encryption circuitry 348 to perform encryption on the data including packet payload, the packet header, and/or the packet header and payload.

After encryption, data is scheduled for transmission out of the uplink a maximum segment size (MSS)-worth of data at a time. For example, an MSS-worth of data that is part of a larger TCP datagram (for example, a TLS record) is segmented and available for transmission. Segmentation can include copying the L2, L3, L4 headers and prepending the headers to the segment of data, and adjusting the checksums and lengths to build a valid header. In some examples, transport layer offload engine 346 performs TCP segmentation offload or large send offload (LSO) for UDP packets. Note that transport layer offload engine 346 can support any protocol such as TCP (e.g., RFC 793), User Datagram Protocol (UDP) (e.g., RFC 768), quick UDP Internet Connections (QUIC) (e.g., QUIC: A UDP-Based Multiplexed and Secure Transport draft-ietf-quic-transport-22 (July 2019)). If the packet is a TLS record without a security association, the packet can be transmitted with no encryption, flagged as a warning, or dropped, depending on an applicable configuration.

A packet can refer to various formatted collections of bits that may be sent across a network, such as Ethernet frames, IP packets, TCP segments, UDP datagrams, QUIC segment, RTP segments, and so forth. References to L2, L3, L4, and L7 layers (or layer 2, layer 3, layer 4, and layer 7) are references respectively to the second data link layer, the third network layer, the fourth transport layer, and the seventh application layer of the OSI (Open System Interconnection) layer model.

A packet can be associated with a flow. A flow can be one or more packets transmitted between two endpoints. A flow can be identified by a set of defined tuples, such as two tuples that identify the endpoints (e.g., source and destination addresses). For some services, flows can be identified at a finer granularity by using five or more tuples (e.g., source address, destination address, IP protocol, transport layer source port, and destination port).

If a packet was successfully received, an ACK can be sent by the receiver to network interface 340. OS 306 can maintain TSO data until all of the packets associated with TSO are acknowledged by a receiver as received. In connection with packet drops or lost packets at a receiver indicated by NACK or duplicate ACK, OS 306 can use a transport layer stack determine whether a packet is to be re-transmitted. In a re-transmit scenario, OS 306 can copy out a section of the saved data, create a new TCP header from that data and cause a packet with the section to be resent to the receiver. However, if the data to be re-transmitted is part of a TLS record or other encrypted content, OS 306 can pass to network interface 340 a pointer to the entire record or a copy of the entire record, as well as a list of byte ranges that are to be re-transmitted and a vector indicating which packet that carries a segment of the record is to be re-transmitted.

In some examples, a sequence number of a packet to be re-transmitted is identified using NACK or duplicate ACK. OS 306 can request application 310 to identify any record corresponding to the packet to be re-transmitted. A transmit context 324 can be used to associate byte ranges of a data with a packet identifier (e.g., sequence number) that is to transmit the byte range of data. Using transmit context 324, application 310 determines which record is the subject of the packet re-transmission and provides an entire record that includes any segment to re-transmit in a packet. As the sequence number of the packet that is to be re-transmitted is identified, TCP stack used by OS 306 can determine which packet that is to convey the record segment (after encryption or no encryption) is to be re-transmitted. TCP stack used by OS 306 can generate a vector that indicates which packet(s) to re-transmit. Driver 308 can cause the record and vector to be written into respective transmit queue 354 and transmit vectors buffer 356.

In an example, application 310 is to cause transmission of a record R0 over 4 packets (P0, P1, P2, P3). Application 310 can send identify the record and OS 306 provides a vector rxtv as 1111 to indicate to send all 4 packets. In the event of re-transmission, OS 306 can identify the record R0 and specify to re-transmit packet P1 that conveys a segment of record R0 and indicate other packets are not to be re-transmitted by providing the record R0 and a vector of 0100. For example, in the event of re-transmission, to encrypt a segment of record to be re-transmitted in packet P1, encryption engine 348 encrypts a segment associated with packet P0 and uses a residual from P0 to encrypt content of packet P1. In some cases, merely the portions of a record that are to be used to encrypt a segment that is to be re-transmitted can be provided to network interface 340 for encryption.

In this example, network interface 340 does not save state of any transmitted packet but uses bandwidth of interfaces 330 and 342, which may not bandwidth constrained, to access a record for packet re-transmission. If a Peripheral Component Interconnect express (PCIe) interface is used, a record can traverse a PCIe interface to be re-encrypted and uses additional bandwidth of the PCIe interface. This leads to some interface bandwidth use, but a PCIe interface may not be a bottleneck, even during peak network events.

Transceiver 370 can be capable of receiving and transmitting packets in conformance with the applicable protocols such as Ethernet as described in IEEE 802.3, although other protocols may be used. Transceiver 370 can receive and transmit packets from and to a network via a network medium (not depicted). Transceiver 370 can include PHY circuitry 372 and media access control (MAC) circuitry 374. PHY circuitry 372 can include encoding and decoding circuitry (not shown) to encode and decode data packets. MAC circuitry 374 can be configured to assemble data to be transmitted into packets, that include destination and source addresses along with network control information and error detection hash values. Network interface 340 includes one or more ports 380-0 to 380-Z. A port can represent a physical port or virtual port. A packet can be transmitted or received using ports 380-0 to 380-Z.

Figure 3B:
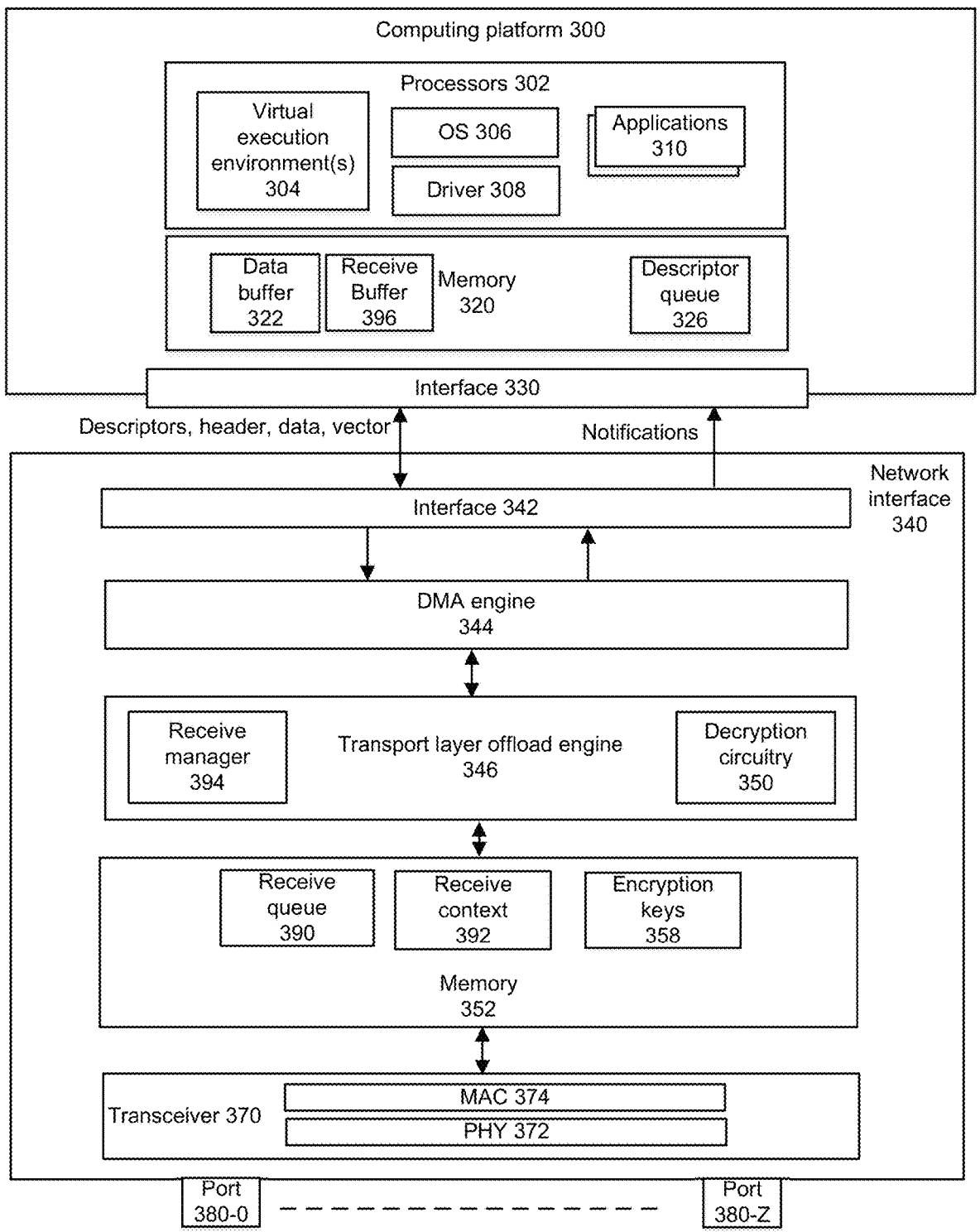

FIG. 3B depicts an example of a receiver system. The receiver system can use similar elements of transmitter system of FIG. 3A and for the sake of illustration, receiver-side elements are described, but elements of transmitter and receiver systems can be combined. Data from received packets can be stored in receive queue 390. Receive manager 394 can use receive context 392 to store a receive context that identifies which segment(s) of a data are received and the received segment(s). Receive manager 394 can determine if all segments of data are received based on identifying a head of data and its specified length in a received packet and identified in receive context 392. Memory 352 can be on or off-chip from network interface 340. Where memory 352 is off-chip from network interface 340, memory 352 can be communicatively coupled using an interface such as any type of double data rate (DDR) memory interface. In some embodiments, after all segments of data are received, the data is decrypted using decryption circuitry 350 and provided to data buffer 322 of platform 300 for access by an application.

In some embodiments, transport layer offload engine 346 can use receive manager 394 to identify received and missing packets and generate ACKs or NACKs or duplicate ACKs to a sender for missing packets and for successfully received packets. For example, if a segment is not received within a timer window of another packet that conveys a segment of the same data, receiver manager 394 can generate and cause transmission of a NACK or duplicate ACK to the receiver to request re-transmission of one or more packets. A NACK or duplicate ACK can identify a missing sequence number.

In some embodiments, described herein, network interface 340 provides received packet headers to receive buffer 396 of platform 300 but does not provide payload data to buffer 396. Instead, dummy or fake payload data is provided to buffer 396. An indicator and/or size of the dummy or fake payload can be indicated in a completion descriptor. A dummy payload can be a pointer to a fixed location in memory and payload may not be copied to the host. OS 306 can manage identifying receipt of packets and generating corresponding ACK/NACKs for successfully received packets and for missing packets. After all segments of a data (e.g., record) are received, the data can be decrypted using decryption circuitry 350 using a key in decryption keys 358 and provided to data buffer 322 of platform 300 for access by an application.

Note that while reference to network interface 340 is made, any type of accelerator, or hardware device can be used in place of network interface such as a storage controller (e.g., Non-volatile memory express (NVMe) storage controller).

Figure 3C:
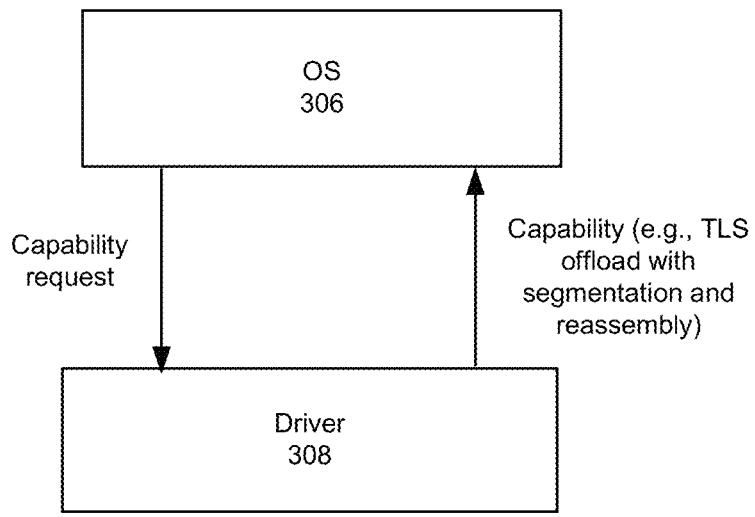
FIG. 3C depicts an example interaction between an operating system and device driver.

FIG. 3C depicts an example interaction between an operating system and device driver. For example, operating system 306 can determine a capability of a device associated with device driver 308. For example, operating system 306 can receive an indication of capability of a device (e.g., network interface) to perform one or more of: data encryption (e.g., TLS or kTLS), data segmentation, packet formation from data segmentation, selective re-transmission of packets with encrypted data, buffering of received packets with encrypted data, reassembly of received data, decryption of received data (e.g., TLS or kTLS), packet receipt acknowledgement or packet re-transmit request, or any operation offloaded to a network interface.

Figure 3D:
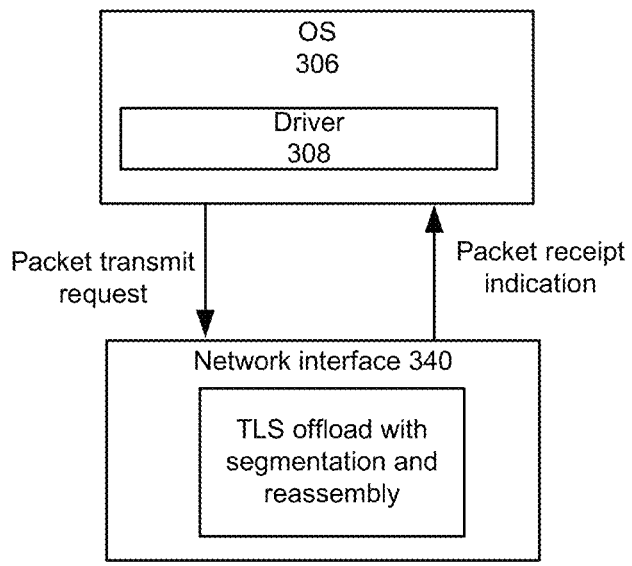
FIG. 3D depicts an example interaction between an operating system and network interface.

FIG. 3D depicts an example interaction between an operating system and network interface. For example, operating system 306 can provide requests to network interface 340 to cause packet transmission and utilize one or more features of network interface 340: data encryption (e.g., TLS or kTLS), data segmentation, packet formation from data segmentation, selective re-transmission of packets with encrypted data, or transport layer segmentation. Network interface 340 can provide operating system 306 an indication of packet receipt. In some examples, indication of packet receipt can include or also include: a received packet header, dummy packet data, decrypted data from data decryption performed by network interface 340, TLS or kTLS data decryption, a decrypted record, a re-transmitted data segment or decrypted data segment, and others.

Figure 4:
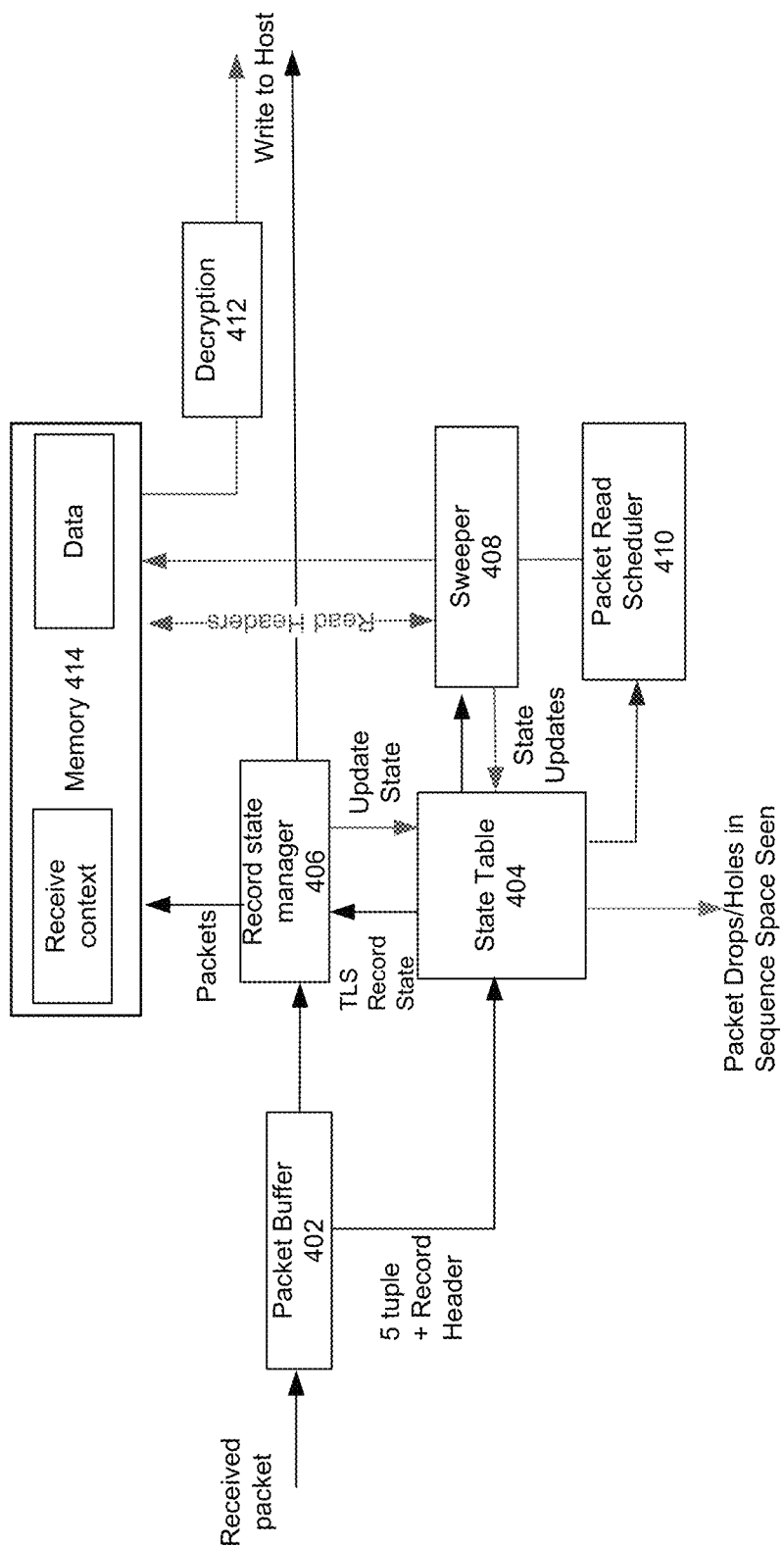
FIG. 4 describes an example block diagram showing determination if segments of a data or record are received.

FIG. 4 depicts an example block diagram showing determination if segments of a data or record are received. As packets are received, a starting sequence number and length of a data or record can be determined from a head of a data or record received in a packet. System 400 can determine if all bytes of a data or record have been received and the data or record can be decrypted or if there are missing portions of the data or record.

A received packet is stored in packet buffer 402. From a received packet, header portions (e.g., 5-tuple or transport layer headers (e.g., TCP headers)) and record header can be provided to state table 404. Based at least on headers and the TLS record headers, state table 404 can be looked up to determine for any record holes (e.g., missing segment(s)) or packet drops per receive sequence number. A packet can carry multiple segments where segment size is less than or equal to an applicable protocol's maximum segment size. Packet segments that are in a head of a queue can be parsed and the contexts within a record structure can be derived. A record structure in state table 404 can include one or more of the following fields.

| Example Field | Example description |
| --- | --- |
| Head record length | Carried for the head record. This can be updated (for subsequent records) as the current/head record is dequeued (e.g., decrypted and sent to host). |
| Last sequence number | Last sequence number sent to the host in the event partial data has been flushed. This can be used for filtering out packets when the remaining packets of the current records arrive. |
| Expected next sequence number | Can be used to track holes for packets that carry data segment for other parts of data that have yet-to-be received. |
| Head record state | Can carry the following states based on which decisions can be made for further processing.<br>State #1 Full/Complete. Data or record is ready for decryption and to be sent to host.<br>State #2 Partially Complete with contiguous segments received towards the head of the queue.<br>State #3 Partially Complete with packet drops detected. This indicates holes detected in the record and hence cannot be sent to the stack. |

In addition, the following information can be tracked: a number of bytes in holes between received sequence number space, sequence number of the duplicate ACK to be sent, congestion controls and timers for ACK/NACK generation and associated states (e.g., encryption keys or pointer to those, partial encrypt/decrypted data present in the memory and their pointer, size of partially encrypted/decrypted data present in the memory).

As contiguous segments are received, record state manager 406 parses packets and updates state table 404 to identify which segments of a particular record are received and provides contents of packets into memory 414. Sweeper 408 can read memory 414, parse the head packets and update the record length in state table 404 to identify an end of a record. The record length is used determine record boundaries for decryption purposes and to determine a next record header.

In the event the record sizes are statically configured and fixed, multiple records can be processed in parallel. Various embodiments can provide a fixed record size and process complete records received out of order. Record sizes can be changed and updates to record sizes used to determine a next used record size.

Sweeper 408 can determine if contiguous segments are received for a particular record. Sweeper 408 determines if a head of queue and a length are received and builds a linked list. A receive context record structure state can be maintained in memory 414. This structure can be managed as a series of linked list of queues and tied to the receiving packets' sequence numbers. An example of a receive context linked list is described with respect to FIG. 5. Multiple record structures can be maintained in memory 414. The structure can be created based on the sequence number of the received packet. The structure can contain a pointer in memory 414 to a flow record, encryption/decryption keys, as well as some states associated with the packets received so far. Once sweeper 408 determines an entire record has been received, sweeper 408 can cause packet read scheduler 410 to output a record to decrypt using decryption engine 412. In some cases, sweeper 408 causes a partial record to be decrypted using decryption engine 412.

Reference is next made to head record states #1 to #3. For state #1, after a head record block state reaches full, the entire block can be decrypted using decryption engine 412 and the decrypted data copied to the host system's memory for access by an application. Per-packet decryption state may not be maintained (e.g., residual values), as the entire record can be decrypted together. After a record is decrypted and if the next packet is available, the subsequent record can move into a head state and a new length can be updated.

For state #2, a data or record is partially received with contiguous segments, and a timer can be started. Upon expiration of the timer, the partial record can be copied to the host for access by the OS, however the data can remain in memory 414. Host software-initiated ACKs can be issued and congestion controls can be used. When the remaining segments of the record arrive, the entire record can be decrypted using decryption engine 412 but the remaining (unsent) content is copied to the host for access by the software stack/driver. For example, if packets 0-3 convey segments 0-3 of a record but packets 0-2 are received, segments 0-2 can be decrypted and if a timer expires, decrypted segments 0-2 are sent to a host. After packet 3 arrives with segment 3, segment 3 can be decrypted using a residual from segment 0, 1, or 2 and decrypted segment 3 provided to the host.

For state #3, for states indicating a partially complete head record with packet drops, a network interface can optionally send a duplicate ACK or NACK for the last received packet sequence number and cause the remote transmitter to resend a lost packet. After the lost packet is received into the record structure, it can be marked as complete thereby transitioning to state #1 and an entire record data if a record can be sent for decryption using decryption engine 412 before being provided to the host. State #2 could also be transitioned to for partial decrypt.

Figure 5:
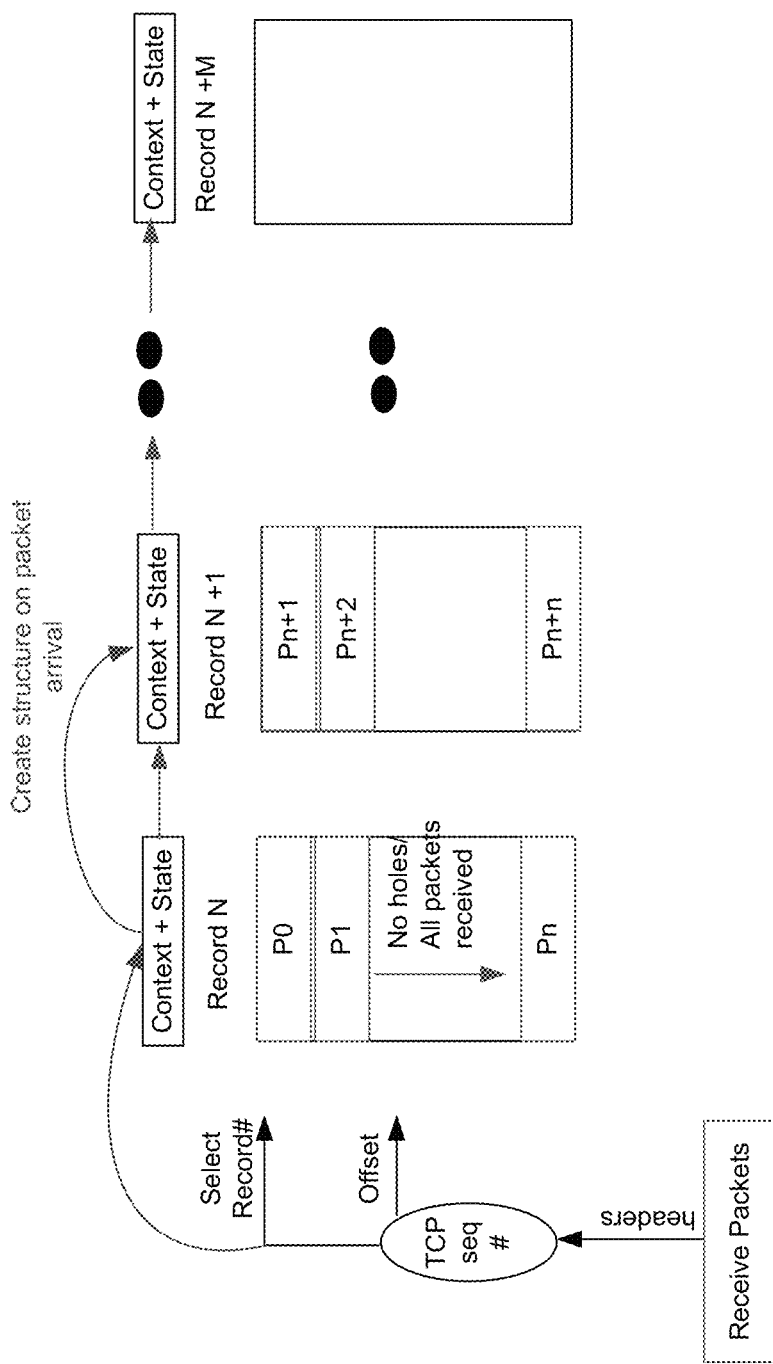
FIG. 5 depicts an example of tracking of received packets for a record.

FIG. 5 depicts an example of tracking of received packets for a record. In this example, a linked list of context and state are created and managed for at least one received record. For example, context and state for record N to record N+M are shown. A context and state information for a record can be created based on a packet arrival whose record head identifies a record that is new (e.g., previously not received record). In some example, a TCP sequence number can be used to select a record number that is being tracked and as an offset into a record's context and state list for use to identify a newly received record segment and update the record's context and state list. As described earlier, a record's head can identify a start of a record and size of a record. The size of the record can identify a number of expected segments. A record's context and state list can be used to track holes in received record segments.

In this example, record N's context and state list indicate the record is completely received and the record N is provided for decryption. The context and state list of record N can be deleted or overwritten. In this example, record N+1's context and state list indicate that not all of record N+1 has been received and there are holes in the record N+1. For record N+1, tracking and operations described earlier with respect to states #1-#3 can be carried out.

Figure 6:
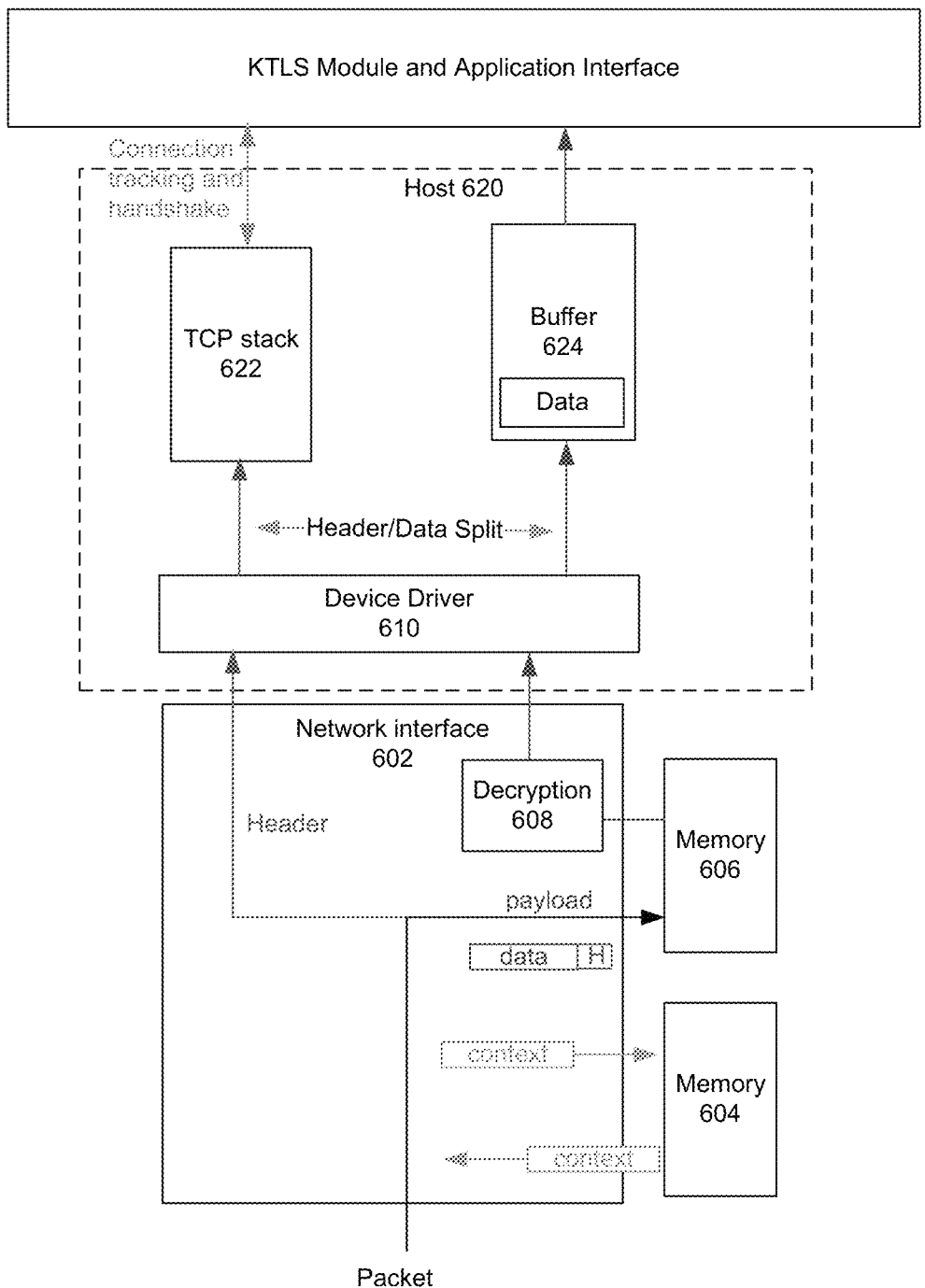
FIG. 6 depicts an example manner of tracking receipt of entire records.

FIG. 6 depicts an example manner of receiving data segments. In this example, headers and data of received packets are split whereby headers are copied to the host for processing by a TCP stack and instead of sending a packet payload, a "dummy" or placeholder payload is provided to the host. As in the embodiments described with respect to FIGS. 4 and 5, a receive context can be retrieved for a received packet to indicate whether a data has been completely received or not. The receive context can be stored in memory 604. The received packet payload can be stored in memory (e.g., memory 606) and network interface 602 can use decryption engine 608 to decrypt data and provide decrypted data to host 620. Memory 606 can store received packet payload along with metadata that indicates a TCP sequence number, status, and so forth. Device driver 610 can be used to coordinate communication between network interface 602 and host 620.

TCP stack 622 can perform congestion control based on TCP header processing independent from data (e.g., record) reassembly and decryption performed by network interface 602. TCP stack 622 executed by host 620 can manage transmission of ACKs for received packets and NACKs for missing packets. In this example, TCP ACK/NACK transmission are managed by TCP stack 622 based on configured congestion schemes. Buffer 624 can store dummy payload data and meta data. After all segments of data are received and decrypted, the data and metadata can be stored in buffer 624 and available for access by an application. However, dummy data can be not provided for access to an application or ignored, except for exception cases or connection establishment.

Figure 7:
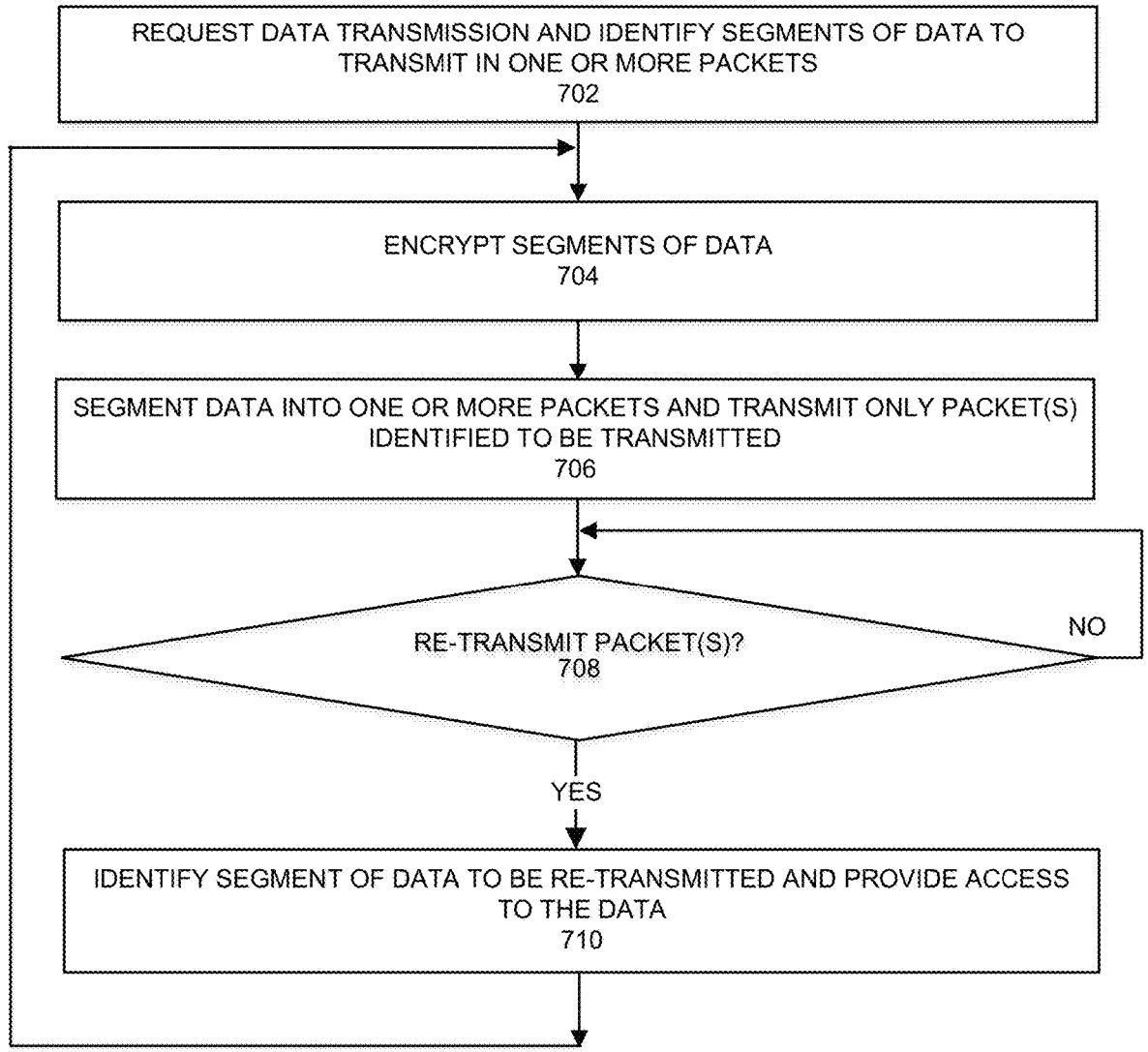
FIG. 7 depicts an example process to be performed by a transmitter system.

FIG. 7 depicts an example process to be performed by a transmitter system. At 702, a host system can request data transmission and identify packets that include parts of the data to transmit. For example, the host system can execute an application that requests transmission of data to a receiver. The host system can execute operating system and driver that cause transmission of the data using a network interface. In some examples, the operating system can identify which parts of the data are to be transmitted using a vector. At 704, the network interface can encrypt segments of data. A segment of data can be TLS record-size worth of data. For example, the network interface can use an encryption offload engine to encrypt segments of data.

At 706, the network interface can segment the data into multiple packets but only transmit packets identified to be transmitted using the vector. For example, if multiple packets are used to transmit a data record, the vector can indicate which packet is to be transmitted by the network interface.

At 708, the network interface can make a determination if a packet re-transmit is to occur. For example, a packet re-transmit may not occur if an ACK or acknowledgement of receipt is received. A packet re-transmit can occur based on receipt of a NACK or duplicate ACK or indication a packet was not received with an expected time window. If a packet re-transmit is to occur, the process continues to 710. If a packet re-transmit is not to occur, the process can repeat 708.

At 710, data to be re-transmitted can be identified. For example, an operating system and application can maintain identifiers of which packets transmitted which data and an identification of a non-received packet by a sequence number can be used to identify the data and packet to be re-transmitted. The process continues to 704, where only the packet(s) identified to be re-transmitted is/are re-transmitted.

Figure 8A:
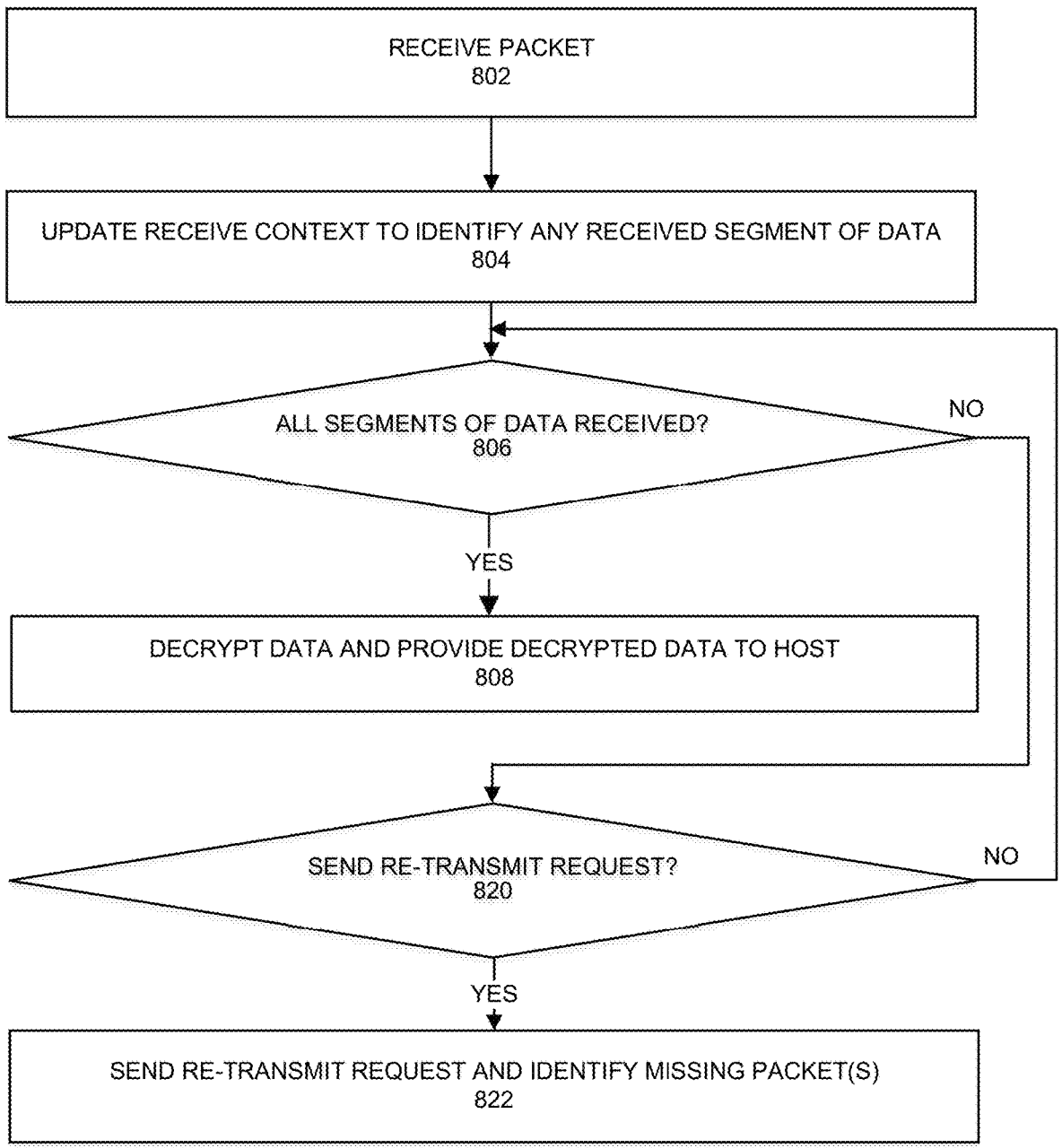
FIGS. 8A and 8B depict example processes to be performed by a receiver system.

FIG. 8A depicts an example process to be performed by a receiver system. At 802, a packet is received at a network interface. The network interface can include the capability to manage re-assembly of data (e.g., TLS records) and also request re-transmissions, if applicable. At 804, an update occurs of a receive context to identify any received segment of the data. Various techniques can be used by a network interface to track receipt of segments of data such as a linked-list that tracks any received data (e.g., record) and any segment received for the data based on receipt of head of the data and length of data expected to be received.

At 806, a determination is made if all segments of data have been received. For example, a receive context can indicate if all segments of the data have been received or not. If all segments of data have been received, the process continues to 808. If all segments have not been received, the process can proceed to 820.

At 808, data can be decrypted using a decryption engine available to the network interface and the decrypted data can be copied to a host system for access from memory by an application. In this example, per-packet decryption state is not maintained and an entire data is decrypted together. Although not depicted, the process can end.

Note that in other examples, if a data receipt timer expires, received portions of the data can be decrypted and provided to the host system in a manner described herein.

At 820, a determination is made if a re-transmit request is to be sent for a packet. For example, upon expiration of a timer, if not all packets carrying segments of the data are received, a determination is made to request packet re-transmission and the process proceeds to 822. However, if a timer has not expired or an applicable policy has not been triggered whereby a packet re-transmit request is to be sent, the process can continue to 806.

At 822, the network interface can send a re-transmit request can be sent for any packet that was not received. For example, the network interface can issue a NACK or duplicate ACK to the sender to indicate non-receipt of a packet. In some examples, upon expiration of the timer, a partially reconstructed data can be copied to the host and the host can issue an ACK or NACK or duplicate ACK and apply congestion control.

Figure 8B:
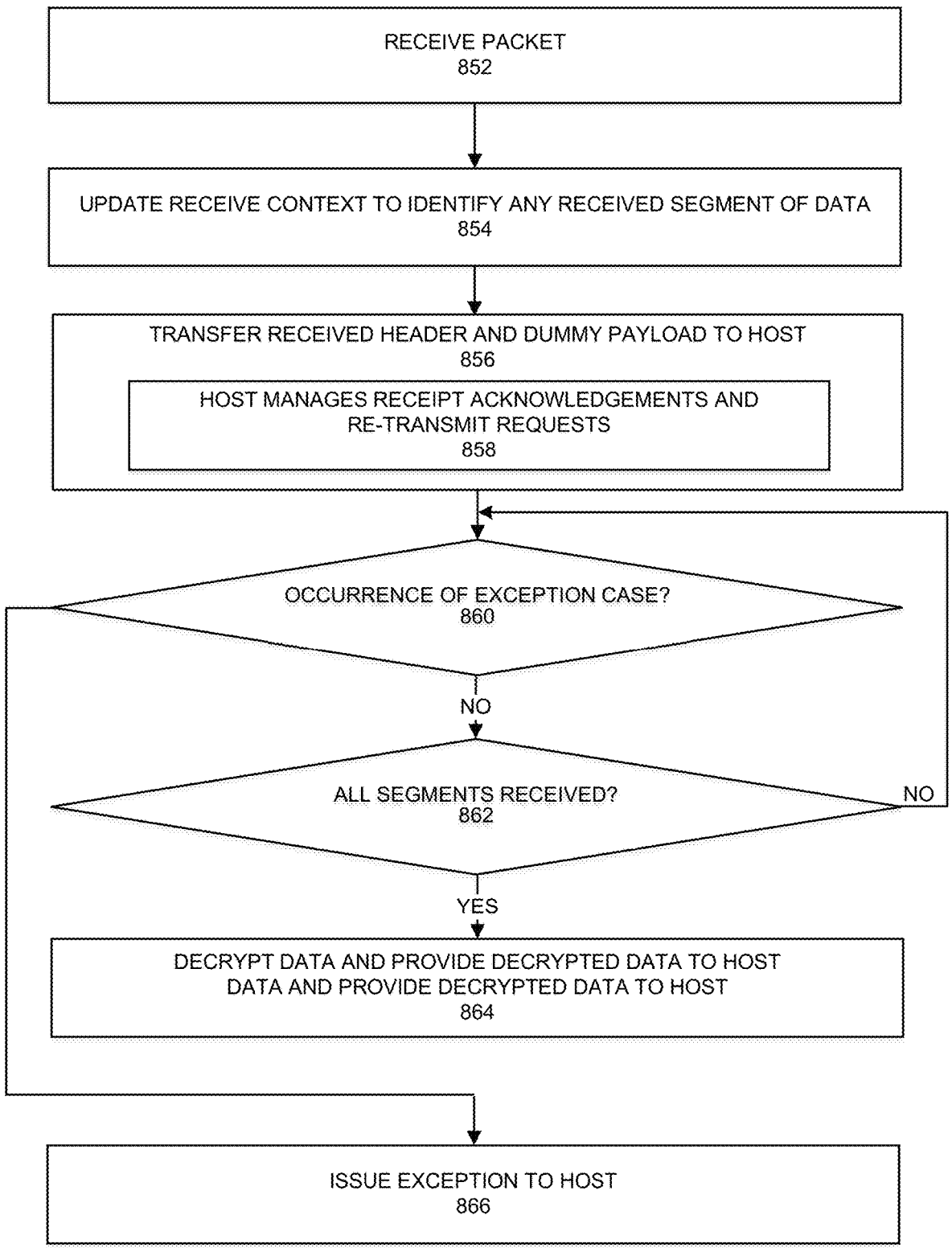

FIG. 8B depicts an example process to be performed by a receiver system. In this example, a host system can manage re-transmit requests and a network interface can re-construct data and decrypt data before providing the decrypted data to a host. Actions 852 and 854 can be substantially similar to respective 802 and 804 of FIG. 8A. At 856, a header of the received packet and a dummy payload can be transferred to the host. For example, a network interface can copy a header of the received packet and a dummy payload to a memory region accessible to the host. At 858, the host can manage receipt of packets that transmit segments of data as well as congestion control. For example, based on an applicable policy, the host (e.g., operating system or transport layer processor) can acknowledge receipt of a packet by issuing an ACK or request packet re-transmission by requesting transmission of a NACK or duplicate ACK to the transmitter. The host can apply or request congestion control to mitigate packet loss.

At 860, a determination is made if an exception case has occurred. For example, an exception case can occur if a timer measuring expected inter-packet receipt time interval of packet segments has expired. If an exception case arises, the process continues to 866, where a host handles an exception. If an exception case is not detected, the process continues to 862.

At 862, a determination is made if all segments of data have been received. For example, a receive context can indicate if all segments of the data have been received or not. If all segments of data have been received, the process continues to 864. If all segments have not been received, the process can return to 860.

At 864, data can be decrypted using a decryption engine available to the network interface and the decrypted data can be copied to a host system for access from memory by an application.

Note that in other examples, if a data receipt timer expires, received portions of the data can be decrypted and provided to the host system in a manner described herein.

Figure 9:
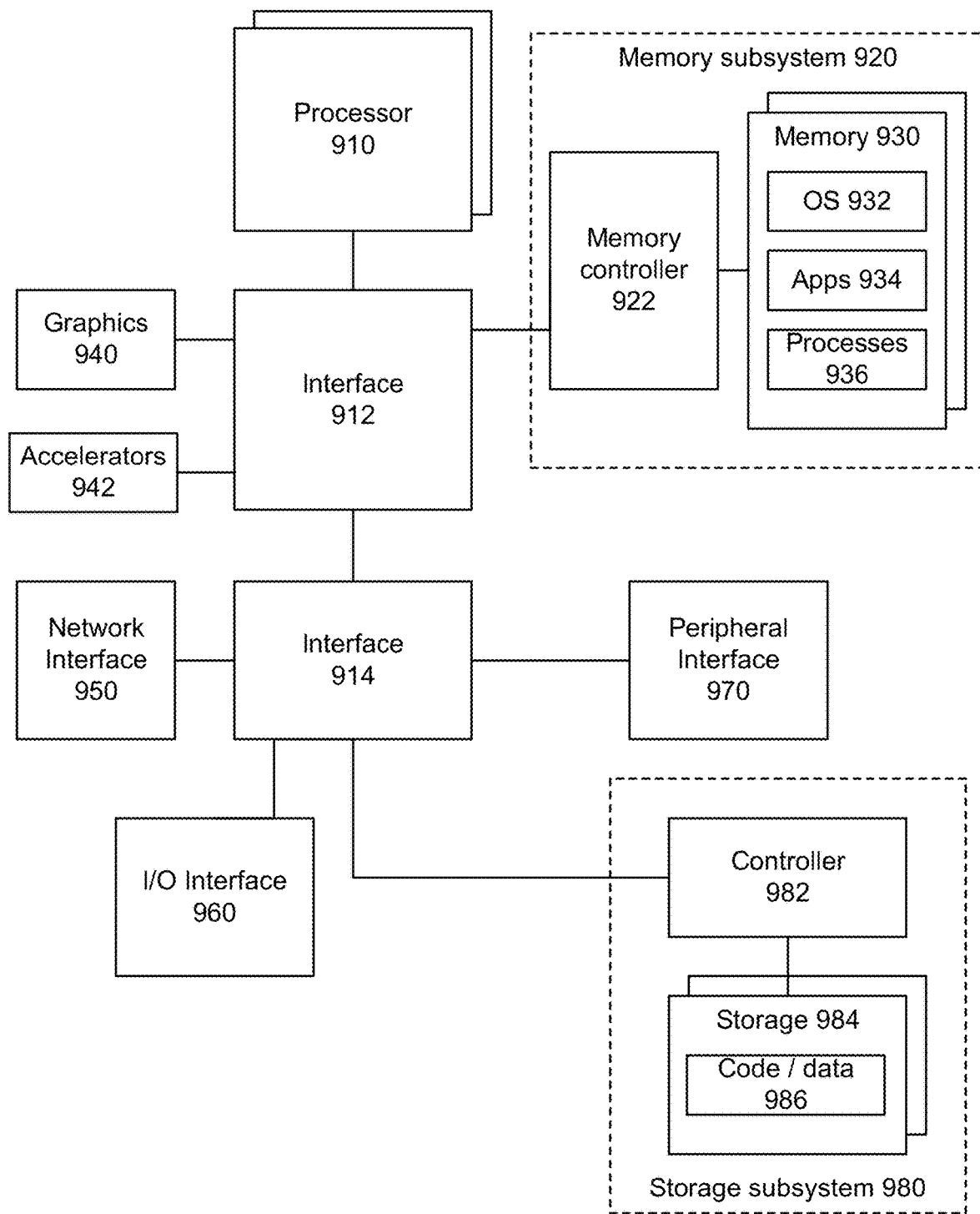
FIG. 9 depicts a system.

FIG. 9 depicts a system. The system can use embodiments described herein to offload transmission and re-transmission of encrypted data to a network interface or to reconstruct received data and decrypted received data prior to providing the decrypted data to a host system. System 900 includes processor 910, which provides processing, operation management, and execution of instructions for system 900. Processor 910 can include any type of microprocessor, central processing unit (CPU), graphics processing unit (GPU), processing core, or other processing hardware to provide processing for system 900, or a combination of processors. Processor 910 controls the overall operation of system 900, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 900 includes interface 912 coupled to processor 910, which can represent a higher speed interface or a high throughput interface for system components that needs higher bandwidth connections, such as memory subsystem 920 or graphics interface components 940, or accelerators 942. Interface 912 represents an interface circuit, which can be a standalone component or integrated onto a processor die. Where present, graphics interface 940 interfaces to graphics components for providing a visual display to a user of system 900. In one example, graphics interface 940 can drive a high definition (HD)

display that provides an output to a user. High definition can refer to a display having a pixel density of approximately 100 PPI (pixels per inch) or greater and can include formats such as full HD (e.g., 1080 p), retina displays, 4 K (ultra-high definition or UHD), or others. In one example, the display can include a touchscreen display. In one example, graphics interface 940 generates a display based on data stored in memory 930 or based on operations executed by processor 910 or both. In one example, graphics interface 940 generates a display based on data stored in memory 930 or based on operations executed by processor 910 or both.

Accelerators 942 can be programmable or fixed function offload engines that can be accessed or used by a processor 910. For example, an accelerator among accelerators 942 can provide compression (DC) capability, cryptography services such as public key encryption (PKE), cipher, hash/authentication capabilities, decryption, or other capabilities or services. In some embodiments, in addition or alternatively, an accelerator among accelerators 942 provides field select controller capabilities as described herein. In some cases, accelerators 942 can be integrated into a CPU or connected to CPU by various devices (e.g., a connector to a motherboard or circuit board that includes a CPU and provides an electrical interface with the CPU). For example, accelerators 942 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 942 can provide multiple neural networks, CPUs, processor cores, general purpose graphics processing units, or graphics processing units can be made available for use by artificial intelligence (AI) or machine learning (ML) models. For example, the AI model can use or include any or a combination of a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 920 represents the main memory of system 900 and provides storage for code to be executed by processor 910, or data values to be used in executing a routine. Memory subsystem 920 can include one or more memory devices 930 such as read-only memory (ROM), flash memory, one or more varieties of random access memory (RAM) such as DRAM, or other memory devices, or a combination of such devices. Memory 930 stores and hosts, among other things, operating system (OS) 932 to provide a software platform for execution of instructions in system 900. Additionally, applications 934 can execute on the software platform of OS 932 from memory 930. Applications 934 represent programs that have their own operational logic to perform execution of one or more functions. Processes 936 represent agents or routines that provide auxiliary functions to OS 932 or one or more applications 934 or a combination. OS 932, applications 934, and processes 936 provide software logic to provide functions for system 900. In one example, memory subsystem 920 includes memory controller 922, which is a memory controller to generate and issue commands to memory 930. It will be understood that memory controller 922 could be a physical part of processor 910 or a physical part of interface 912. For example, memory controller 922 can be an integrated memory controller, integrated onto a circuit with processor 910.

While not specifically illustrated, it will be understood that system 900 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 900 includes interface 914, which can be coupled to interface 912. In one example, interface 914 represents an interface circuit, which can include standalone components and integrated circuitry. In one example, multiple user interface components or peripheral components, or both, couple to interface 914. Network interface 950 provides system 900 the ability to communicate with remote devices (e.g., servers or other computing devices) over one or more networks. Network interface 950 can include an Ethernet adapter, wireless interconnection components, cellular network interconnection components, USB (universal serial bus), or other wired or wireless standards-based or proprietary interfaces. Network interface 950 can transmit data to a device that is in the same data center or rack or a remote device, which can include sending data stored in memory. Network interface 950 can receive data from a remote device, which can include storing received data into memory. Various embodiments can be used in connection with network interface 950, processor 910, and memory subsystem 920.

In one example, system 900 includes one or more input/output (I/O) interface(s) 960. I/O interface 960 can include one or more interface components through which a user interacts with system 900 (e.g., audio, alphanumeric, tactile/touch, or other interfacing). Peripheral interface 970 can include any hardware interface not specifically mentioned above. Peripherals refer generally to devices that connect dependently to system 900. A dependent connection is one where system 900 provides the software platform or hardware platform or both on which operation executes, and with which a user interacts.

In one example, system 900 includes storage subsystem 980 to store data in a nonvolatile manner. In one example, in certain system implementations, at least certain components of storage 980 can overlap with components of memory subsystem 920. Storage subsystem 980 includes storage device(s) 984, which can be or include any conventional medium for storing large amounts of data in a nonvolatile manner, such as one or more magnetic, solid state, or optical based disks, or a combination. Storage 984 holds code or instructions and data 986 in a persistent state (e.g., the value is retained despite interruption of power to system 900). Storage 984 can be generically considered to be a "memory," although memory 930 is typically the executing or operating memory to provide instructions to processor 910. Whereas storage 984 is nonvolatile, memory 930 can include volatile memory (e.g., the value or state of the data is indeterminate if power is interrupted to system 900). In one example, storage subsystem 980 includes controller 982 to interface with storage 984. In one example controller 982 is a physical part of interface 914 or processor 910 or can include circuits or logic in both processor 910 and interface 914.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). Another example of volatile memory includes cache or static random access memory (SRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 900. More specifically, power source typically interfaces to one or multiple power supplies in system 900 to provide power to the components of system 900. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 900 can be implemented using interconnected compute sleds of processors, memories, storages, network interfaces, and other components. High speed interconnects can be used such as PCIe, Ethernet, or optical interconnects (or a combination thereof).

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In an example, system 900 can be implemented using interconnected compute sleds of processors, memories, storages, network interfaces, and other components. High speed interconnects can be used such as: Ethernet (IEEE 802.3), remote direct memory access (RDMA), InfiniB and, Internet Wide Area RDMA Protocol (iWARP), User Datagram Protocol (UDP), quick User Datagram Protocol (UDP) Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

Figure 10:
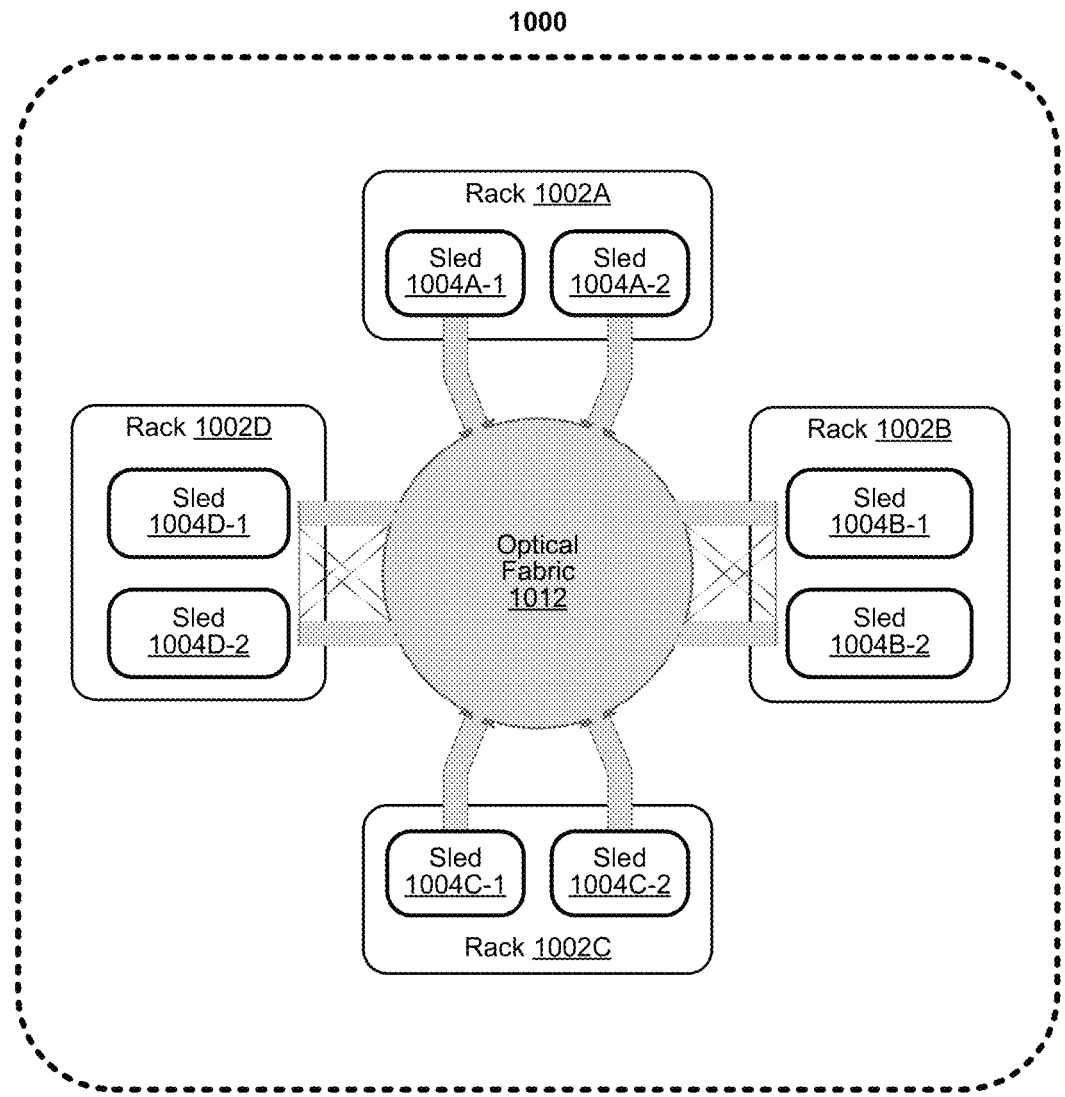
FIG. 10 depicts an example of a data center.

FIG. 10 depicts an example of a data center. Various embodiments can be used in or with the data center of FIG. 10 in connection with transmission and reconstruction of encrypted received data. As shown in FIG. 10, data center 1000 may include an optical fabric 1012. Optical fabric 1012 may generally include a combination of optical signaling media (such as optical cabling) and optical switching infrastructure via which any particular sled in data center 1000 can send signals to (and receive signals from) the other sleds in data center 1000. The signaling connectivity that optical fabric 1012 provides to any given sled may include connectivity both to other sleds in a same rack and sleds in other racks. Data center 1000 includes four racks 1002A to 1002D and racks 1002A to 1002D house respective pairs of sleds 1004A-1 and 1004A-2, 1004B-1 and 1004B-2, 1004C-1 and 1004C-2, and 1004D-1 and 1004D-2. Thus, in this example, data center 1000 includes a total of eight sleds. Optical fabric 10012 can provide sled signaling connectivity with one or more of the seven other sleds. For example, via optical fabric 10012, sled 1004A-1 in rack 1002A may possess signaling connectivity with sled 1004A-2 in rack 1002A, as well as the six other sleds 1004B-1, 1004B-2, 1004C-1, 1004C-2, 1004D-1, and 1004D-2 that are distributed among the other racks 1002B, 1002C, and 1002D of data center 1000. The embodiments are not limited to this example. For example, fabric 1012 can provide optical and/or electrical signaling.

Figure 11:
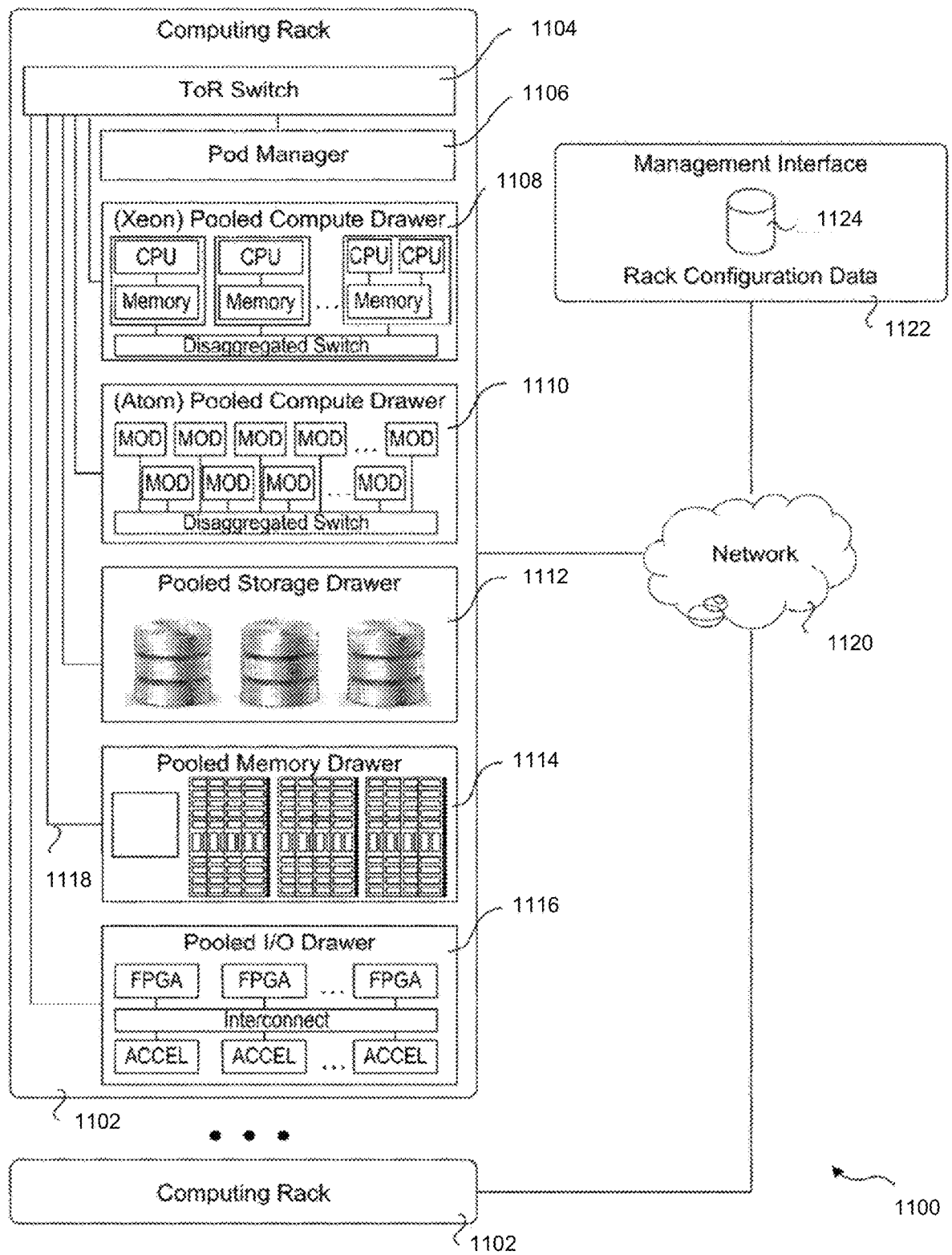
FIG. 11 depicts an environment.

FIG. 11 depicts an environment 1100 includes multiple computing racks 1102, some including a Top of Rack (ToR) switch 1104, a pod manager 1106, and a plurality of pooled system drawers. Various embodiments can be used to transmit or receive encrypted data in a manner described herein. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 1108, and Intel® ATOM™ pooled compute drawer 1110, a pooled storage drawer 1112, a pooled memory drawer 1114, and a pooled I/O drawer 1116. Some of the pooled system drawers is connected to ToR switch 1104 via a high-speed link 1118, such as a 40 Gigabit/second (Gb/s) or 100 Gb/s Ethernet link or a 100+ Gb/s Silicon Photonics (SiPh) optical link. In one embodiment high-speed link 1118 comprises an 800 Gb/s SiPh optical link.

Multiple of the computing racks 1102 may be interconnected via their ToR switches 1104 (e.g., to a pod-level switch or data center switch), as illustrated by connections to a network 1120. In some embodiments, groups of computing racks 1102 are managed as separate pods via pod manager(s) 1106. In one embodiment, a single pod manager is used to manage racks in the pod. Alternatively, distributed pod managers may be used for pod management operations.

Environment 1100 further includes a management interface 1122 that is used to manage various aspects of the environment. This includes managing rack configuration, with corresponding parameters stored as rack configuration data 1124.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Illustrative examples of the devices, systems, and methods disclosed herein are provided below. An embodiment of the devices, systems, and methods may include any one or more, and any combination of, the examples described below.

Example 1 includes a computer-readable medium, comprising instructions that when performed by one or more processors, cause the one or more processors to: determine a capability of a network interface, the capability comprising a capability to perform a Transport Layer Security (TLS) cryptographic operation and segmentation or reassembly of data.

Example 2 includes any example, wherein an operating system (OS) is to determine the capability from at least a driver associated with the network interface.

Example 3 includes any example, wherein a capability of the network interface comprises the network interface performing TLS encryption and segmentation of data prior to transmission in a packet.

Example 4 includes any example, wherein a capability of the network interface comprises the network interface performing TLS decryption and reassembly of data received in one or more packets.

Example 5 includes any example, wherein an operating system (OS) is to cause the network interface to encrypt a data and segment the encrypted data into packets and the OS is to indicate which packet among the packets to transmit.

Example 6 includes any example, wherein in response to a re-transmit request, an operating system (OS) is to cause the network interface to encrypt a data and segment the encrypted data into packets and the OS is to indicate which packet among the packets to re-transmit.

Example 7 includes any example, wherein the capability further comprises a capability of the network interface to manage packet receipt and non-receipt and send acknowledgements (ACKs), negative-acknowledgement (NACK) or duplicate acknowledgements.

Example 8 includes any example, wherein the capability further comprises a capability of the network interface to perform TLS decryption and re-assembly of data segments and provide headers of received packets to a host system for the host system to manage and the host system to cause the network interface to send acknowledgements (ACKs), negative-acknowledgement (NACK) or duplicate acknowledgements.

Example 9 includes any example, and includes an apparatus comprising: an interface to: in response to a data transmit request, perform a Transport Layer Security (TLS) encryption operation and segmentation of data and in response to a packet receipt, perform reassembly of data and TLS decryption of data.

Example 10 includes any example, wherein the interface is to perform transmission control protocol (TCP) segmentation of encrypted data.

Example 11 includes any example, wherein the interface is to manage packet receipt and non-receipt and send acknowledgements (ACKs), negative-acknowledgement (NACK) or duplicate acknowledgements.

Example 12 includes any example, wherein the interface is to track completion of a record received from a packet based on a start of record indicator and length indicator received in a packet.

Example 13 includes any example, wherein the interface is to perform TLS decryption and re-assembly of data segments and provide headers of received packets to a host system and the host system is to manage packet receipt and non-receipt and cause the interface to send acknowledgements (ACKs), negative-acknowledgement (NACK) or duplicate acknowledgements.

Example 14 includes any example, wherein the interface is to receive indications of which packets to transmit and wherein the interface is to re-transmit solely one or more packets that comprise a segment of encrypted data referenced by an indication of failure of receipt of one or more packets.

Example 15 includes any example, comprising a host system, the host system comprising a processor and a memory, the memory to store a transmit context that is to associate a data segment with a transmitted packet identifier and based on indication of failure of receipt of one or more packets that carry segments of the data, and the processor of the host system is to identify one or more of the packets for re-transmission based on the transmitted packet identifier.

Example 16 includes any example, wherein the interface comprises a network interface communicatively coupled to one or more of: a server, data center, or rack.

Example 17 includes any example, and includes a computer-implemented method comprising: configuring a network interface to transmit data by performing Transport Layer Security (TLS) encryption and segmentation of encrypted data and configuring the network interface to process received packets by performing reassembly and TLS decryption of encrypted data.

Example 18 includes any example, wherein an operating system performs the configuring a network interface to transmit data and configuring the network interface to process received packets.

Example 19 includes any example, and includes: based on a re-transmit request, causing re-transmission solely of a non-received packet with an encrypted data segment.

Example 20 includes any example, and includes: receiving a new key for use to encrypt or decrypt one or more data segments and causing use by the network interface of the new key for use to encrypt or decrypt one or more data segments.

What is claimed is:

1. At least one non-transitory computer-readable medium, comprising instructions that when performed by one or more processors, cause the one or more processors to:
determine at least one offloaded capability of a network interface, the at least one offloaded capability comprising a first offloaded capability to perform a Transport Layer Security (TLS) cryptographic operation and segmentation operation on a first TLS record data prior to transmission and a second offloaded capability to identify a non-received packet with a portion of the first TLS record data and perform a re-transmission operation of a non-received packet with the portion of the first TLS record data and
enable the network interface to perform the second offloaded capability, wherein
to identify the non-received packet with the portion of the first TLS record data and perform the re-transmission operation of the non-received packet with the portion of the first TLS record data, the network interface is to determine the non-received packet with the portion of the first TLS record data and re-transmit solely the non-received packet with less than an entirety of the first TLS record data.

2. The computer-readable medium of claim 1, comprising instructions that when performed by the one or more processors, cause the one or more processors to execute an operating system (OS) to determine the at least one capability from at least a driver associated with the network interface.

3. The computer-readable medium of claim 1, comprising instructions that when performed by the one or more processors, cause the one or more processors to execute an operating system (OS) to cause the network interface to encrypt the TLS record data and segment the encrypted TLS record data into one or more packets and the OS is to indicate which packet among the one or more packets to transmit.

4. The computer-readable medium of claim 1, comprising instructions that when performed by the one or more processors, cause the one or more processors to execute an operating system (OS), wherein in response to a re-transmit request, the OS is to cause the network interface to encrypt the TLS record data and segment the encrypted TLS record data into one or more packets and the OS is to indicate which packet among the one or more packets to re-transmit based on an indicator.

5. The computer-readable medium of claim 1, wherein the second capability to perform a re-transmission operation of a non-received packet with the portion of the first TLS record data comprises capabilities of the network interface to manage packet receipt and non-receipt and send acknowledgements (ACKs), negative-acknowledgement (NACK) or duplicate acknowledgements.

6. The computer-readable medium of claim 1, comprising instructions that when performed by one or more processors, cause the one or more processors to:
execute an operating system (OS) to segment data along TLS record boundaries and provide the segmented data along TLS record boundaries as the TLS record data for transmission.

7. The computer-readable medium of claim 1, wherein the TLS cryptographic operation comprises Linux kernel TLS (kTLS) operation.

8. The computer-readable medium of claim 1, wherein the at least one offloaded segmentation operation on the first TLS record data prior to transmission comprises segmentations of the first TLS record data into one or more packets based on maximum segment size (MSS).

9. The computer-readable medium of claim 1, comprising instructions that when performed by one or more processors, cause the one or more processors to:
determine a third capability of a network interface, the third capability comprising a capability to perform cryptographic operation offloaded from a host and reassembly operation offloaded from the host on received TLS record data and
enable the network interface to perform the third capability, wherein to perform the cryptographic operation offloaded from the host and reassembly operation offloaded from the host on received TLS record data, the network interface is to store a received segment of the TLS record data in memory despite non-receipt of a segment of the TLS record data and based on receipt of at least one packet that includes a non-received segment of the TLS record data, decrypt the TLS record data with the stored received segment of the TLS record data.

10. An apparatus comprising:
interface circuitry and
a network interface coupled to the interface circuitry, the network interface to:
in response to a data transmit request, perform at least one operation offloaded from a host of a Transport Layer Security (TLS) encryption operation and at least one operation offloaded from the host of segmentation of a first TLS record data prior to transmission of the first TLS record data in two or more packets;
in response to a re-transmission request of a non-received packet, of the two or more packets, perform at least one operation offloaded from the host to identify the non-received packet with a portion of the first TLS record data and re-transmit solely the non-received packet with less than an entirety of the first TLS record data.

11. The apparatus of claim 10, wherein to perform the segmentation of the first TLS record data prior to transmission of the first TLS record data in two or more packets, the network interface is to perform transmission control protocol (TCP) segmentation of encrypted data.

12. The apparatus of claim 10, wherein the network interface is to manage packet receipt and non-receipt and send acknowledgements (ACKs), negative-acknowledgement (NACK) or duplicate acknowledgements.

13. The apparatus of claim 10, wherein the network interface is to track completion of a record received from a packet based on a start of record indicator and length indicator received in the packet.

14. The apparatus of claim 10, comprising a host system, the host system comprising a processor and a memory, the memory to store a transmit context that is to associate the TLS record data segment with a transmitted packet identifier and based on indication of failure of receipt of one or more packets that carry segments of the TLS record data, and the processor of the host system is to identify one or more of the packets for re-transmission based on the transmitted packet identifier.

15. The apparatus of claim 10, wherein the network interface comprises a network interface device communicatively coupled to one or more of: a server, data center, or rack.

16. The apparatus of claim 10, wherein the network interface is to re-transmit multiple packets with a TLS record data based on receipt a single indicator from a host system.

17. The apparatus of claim 10, wherein:
the network interface is to:
perform a decryption operation offloaded from the host and reassembly operation offloaded from the host of a second TLS record data received in packets, wherein the perform decryption and reassembly of the second TLS record data received in the packets comprises:
store one or more segments of the second TLS record data from at least one received packet in memory despite non-receipt of a segment of the second TLS record data and
based on receipt of at least one packet that includes a non-received segment of the second TLS record data, decrypt the second TLS record data using the stored one or more segments of the second TLS record data.

18. A computer-implemented method comprising:
configuring a network interface to perform at least one operation offloaded from a host to transmit data by performing Transport Layer Security (TLS) encryption and perform at least one operation offloaded from the host of segment an encrypted first TLS record data to be transmitted in two or more packets; and
configuring the network interface to perform at least one operation offloaded from the host to identify a non-received packet with a portion of the first TLS record data, and perform at least one operation offloaded from the host to re-transmit solely a non-received packet, of the two or more packets, with less than an entirety of the first TLS record data.

19. The method of claim 18, wherein an operating system (OS) performs the configuring the network interface to perform at least one operation offloaded from the host to transmit TLS record data, perform at least one operation offloaded from the host to identify the non-received packet with the portion of the first TLS record data, and perform at least one operation offloaded from the host to re-transmit solely the non-received packet.

20. The method of claim 18, comprising:
receiving a new key for use to encrypt or decrypt one or more TLS record data segments and
causing use by the network interface of the new key for use to encrypt or decrypt one or more TLS record data segments.

21. The method of claim 18, comprising:
an operating system:
configuring the network interface to operations offloaded from the host of processing of received packets by performing reassembly and TLS decryption of encrypted TLS record data from the received packets and
configuring the network interface to store one or more segments of the TLS record data from at least one received packet in memory despite non-receipt of a segment of the TLS record data and based on receipt of at least one packet that includes a non-received segment of the TLS record data, perform TLS decryption of the TLS record data.

22. An apparatus comprising:
interface circuitry and
a network interface coupled to the interface circuitry, the network interface to:
in response to a packet receipt:
perform at least one operation offloaded from a host of reassembly of data and Transport Layer Security (TLS) decryption of TLS record data received in one or more packets;
store one or more segments of the TLS record data from at least one received packet in memory despite non-receipt of a segment of the TLS record data;
based on receipt of at least one packet that includes solely the at least one non-received segment of the TLS record data, perform at least one operation offloaded from the host of decryption of the TLS record data;
in response to a data transmit request, perform at least one operation offloaded from the host of TLS encryption operation and segmentation of a first TLS record data prior to transmission of the first TLS record data in two or more packets; and
in response to a re-transmission request of a non-received packet, of the two or more packets, perform at least one operation offloaded from the host to identify the non-received packet and re-transmit solely the non-received packet with less than an entirety of the first TLS record data.

* * * * *